United States Patent
Sakamoto et al.

(10) Patent No.: US 9,550,902 B1
(45) Date of Patent: Jan. 24, 2017

(54) AQUEOUS INK, INK CARTRIDGE, INK DRYING SYSTEM, INK DRYING METHOD, RECORDING APPARATUS, AND RECORDING METHOD

(71) Applicant: FUJI XEROX CO., LTD., Tokyo (JP)

(72) Inventors: Akira Sakamoto, Kanagawa (JP);
Kazuhiko Hirokawa, Kanagawa (JP);
Takashi Kikuchi, Kanagawa (JP);
Takahiro Ishizuka, Kanagawa (JP);
Suguru Nakaso, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/009,226

(22) Filed: Jan. 28, 2016

(30) Foreign Application Priority Data

Jul. 16, 2015 (JP) ................... 2015-142373

(51) Int. Cl.
*B41J 2/14* (2006.01)
*C09D 11/38* (2014.01)
*B41J 2/01* (2006.01)

(52) U.S. Cl.
CPC . *C09D 11/38* (2013.01); *B41J 2/01* (2013.01)

(58) Field of Classification Search
CPC .......... B41J 2/2107; B41J 2/01; C09D 11/322; C09D 11/30; C09D 11/40; C09D 11/101; C09D 11/328; C09D 11/324
See application file for complete search history.

(56) References Cited

U.S. PATENT DOCUMENTS

| | | | |
|---|---|---|---|
| 6,361,916 B1 | 3/2002 | Chen et al. | |
| 7,892,340 B2 * | 2/2011 | Namba | B41M 5/502 106/31.78 |

(Continued)

FOREIGN PATENT DOCUMENTS

| | | |
|---|---|---|
| JP | 2001-234000 A | 8/2001 |
| JP | 2002-187955 A | 7/2002 |

(Continued)

*Primary Examiner* — Lamson Nguyen
(74) *Attorney, Agent, or Firm* — Sughrue Mion, PLLC

(57) ABSTRACT

An aqueous ink contains a colorant, an aqueous solvent, and as an infrared absorber, a compound represented by general formula (I):

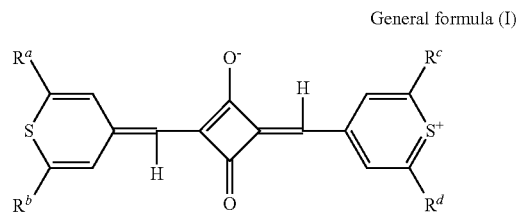

General formula (I)

where $R^b$, $R^c$, and $R^d$ are each independently alkyl, and $R^a$ is a group represented by general formula (I-R):

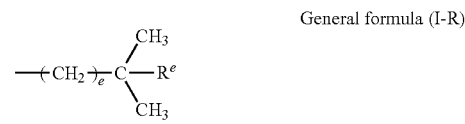

General formula (I-R)

where $R^e$ is hydrogen or methyl, and e is an integer of 0 to 3.

17 Claims, 3 Drawing Sheets

(56) References Cited

U.S. PATENT DOCUMENTS 7,918,551 B2 * 4/2011 Kinas .................... B41M 3/14
                                                347/100
8,444,755 B2 * 5/2013 Namba ................ B41M 5/506
                                                106/31.86

FOREIGN PATENT DOCUMENTS

JP          2014-047302 A       3/2014
JP          2014-047303 A       3/2014

* cited by examiner

AQUEOUS INK, INK CARTRIDGE, INK DRYING SYSTEM, INK DRYING METHOD, RECORDING APPARATUS, AND RECORDING METHOD

CROSS-REFERENCE TO RELATED APPLICATIONS

This application is based on and claims priority under 35 USC 119 from Japanese Patent Application No. 2015-142373 filed Jul. 16, 2015.

BACKGROUND

Technical Field

The present invention relates to aqueous inks, ink cartridges, ink drying systems, ink drying methods, recording apparatuses, and recording methods.

SUMMARY

According to an aspect of the invention, there is provided an aqueous ink containing a colorant, an aqueous solvent, and as an infrared absorber, a compound represented by general formula (I):

General formula (I)

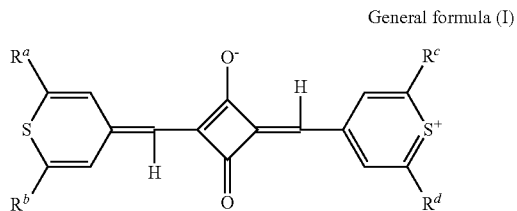

where $R^b$, $R^c$, and $R^d$ are each independently alkyl, and $R^a$ is a group represented by general formula (I-R):

General formula (I-R)

where $R^e$ is hydrogen or methyl, and e is an integer of 0 to 3.

BRIEF DESCRIPTION OF THE DRAWINGS

Exemplary embodiments of the present invention will be described in detail based on the following figures, wherein.

DETAILED DESCRIPTION

Figure 1:
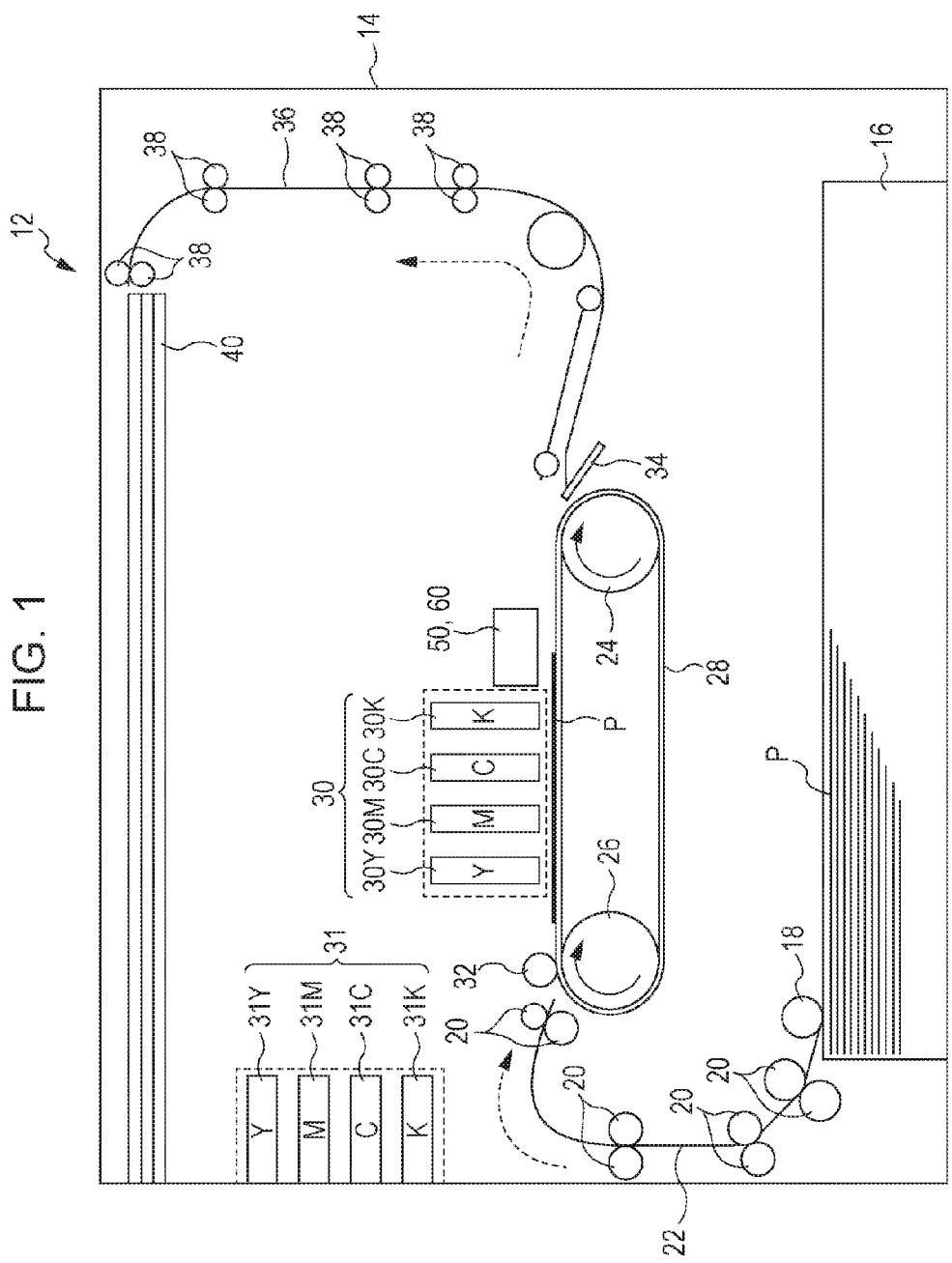
FIG. 1 is a schematic view of an inkjet recording apparatus according to an exemplary embodiment of the invention.

Exemplary embodiments of the present invention will now be described.

Aqueous Ink

An aqueous ink according to an exemplary embodiment of the present invention contains a colorant, an infrared absorber, and an aqueous solvent.

The infrared absorber is a compound represented by general formula (I) above. This compound may be used to provide an aqueous ink that may exhibit only a small decrease in infrared absorption performance after extended storage.

Although the mechanism is not fully understood, one possible mechanism is as follows.

There is a known drying unit that dries an aqueous ink (hereinafter also referred to as "ink") deposited on a recording medium (e.g., paper) by irradiation with infrared radiation.

This drying unit is intended for use with inks that absorb infrared radiation. However, common color inks contain no infrared-absorbing material and thus exhibit low infrared absorption. To enhance the infrared absorption, infrared-absorbing materials, or infrared absorbers, may be added to the color inks. Since most infrared absorbers are poorly soluble in water, they are typically dispersed in the color inks using dispersants.

Color inks containing infrared absorbers are alkaline, as are common color inks. When a color ink containing an infrared absorber that is poorly soluble in water is stored for an extended period of time, the infrared absorber is readily decomposed by the action of the solvent (e.g., an alkaline solvent (e.g., aqueous sodium hydroxide solution, aqueous lithium hydroxide solution, or aqueous potassium hydroxide solution), oxyethylene alkyl ether solvent, ethanolamine, 2-pyrrolidone, or water) and the functional materials (e.g., dispersants and surfactants) present in the color ink. This tends to result in decreased infrared absorption performance.

Structural analysis has revealed that, if a compound having a squarylium backbone is used as an infrared absorber, a particular bond tends to be attacked. Specifically, if the compound having a squarylium backbone is a compound having a four-membered ring derived from squaric acid in the center thereof, a thiopyrylium moiety linked to one end of the four-membered ring via a double bond, and a thiopyrylium ion linked to another end of the four-membered ring via a double bond, the bond between the four-membered ring and the thiopyrylium ion (hereinafter also referred to as "particular bond") tends to be broken after extended storage. This is presumably because the particular bond is susceptible to attack by the molecules of the solvent and functional materials present in the color ink. The breakage of the particular bond will lead to the decomposition of the squarylium compound.

Accordingly, the aqueous ink according to this exemplary embodiment contains, as an infrared absorber, a compound (squarylium compound) represented by general formula (I).

The compound represented by general formula (I) is a compound having a four-membered ring derived from squaric acid in the center thereof and thiopyrylium moieties (thiopyrylium ions) at both ends of the four-membered ring. These thiopyrylium moieties have alkyl groups at the 2- and 6-positions thereof. At least one of the alkyl groups is a branched alkyl group having three or more carbon atoms; therefore, at least one of the thiopyrylium moieties has a bulky structure.

The foregoing structure may allow the particular bond of the compound represented by general formula (I) to be less accessible by the molecules of the materials (e.g., the solvent and the functional materials) that are believed to attack the particular bond. That is, the particular bond may be more resistant to attack by such molecules, and the compound represented by general formula (I) may therefore be more resistant to decomposition in the aqueous ink.

The aqueous ink according to this exemplary embodiment may thus exhibit only a small decrease in infrared absorption performance after extended storage.

The individual components of the aqueous ink according to this exemplary embodiment will now be described in detail.

Colorant

Examples of colorants include pigments. Examples of pigments include organic pigments and inorganic pigments.

Examples of black pigments include, but not limited to, Raven 7000, Raven 5750, Raven 5250, Raven 5000 Ultra II, Raven 3500, Raven 2000, Raven 1500, Raven 1250, Raven 1200, Raven 1190 Ultra II, Raven 1170, Raven 1255, Raven 1080, and Raven 1060 (available from Columbian Carbon Company); Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (available from Cabot Corporation); Color Black FW1, Color Black FW2, Color Black FW2V, Color Black 18, Color Black FW200, Color Black 5150, Color Black 5160, Color Black 5170, Printex 35, Printex U, Printex V, Printex 140U, Printex 140V, Special Black 6, Special Black 5, Special Black 4A, and Special Black 4 (available from Evonik Degussa Japan Co., Ltd.); and No. 25, No. 33, No. 40, No. 47, No. 52, No. 900, No. 2300, MCF-88, MA600, MA7, MA8, and MA100 (available from Mitsubishi Chemical Corporation).

Examples of cyan pigments include, but not limited to, C.I. Pigment Blue 1, 2, 3, 15, 15:1, 15:2, 15:3, 15:4, 16, 22, and 60.

Examples of magenta pigments include, but not limited to, C.I. Pigment Red 5, 7, 12, 48, 48:1, 57, 112, 122, 123, 146, 168, 177, 184, and 202 and C.I. Pigment Violet 19.

Examples of yellow pigments include, but not limited to, C.I. Pigment Yellow 1, 2, 3, 12, 13, 14, 16, 17, 73, 74, 75, 83, 93, 95, 97, 98, 114, 128, 129, 138, 151, 154, and 180.

These pigments, if used, may be used in combination with pigment dispersants. Examples of pigment dispersants that may be used include polymer dispersants, anionic surfactants, cationic surfactants, amphoteric surfactants, and nonionic surfactants.

Examples of pigment dispersants include polymers having a hydrophilic moiety and a hydrophobic moiety. Examples of polymers having a hydrophilic moiety and a hydrophobic moiety include condensation polymers and addition polymers. Examples of condensation polymers include known polyester dispersants. Examples of addition polymers include addition polymers of monomers having an α,β-ethylenically unsaturated group. A monomer having an α,β-ethylenically unsaturated group with a hydrophilic moiety and a monomer having an α,β-ethylenically unsaturated group with a hydrophobic moiety may be copolymerized to obtain the target pigment dispersant. Homopolymers of monomers having an α,β-ethylenically unsaturated group with a hydrophilic moiety may also be used.

Examples of monomers having an α,β-ethylenically unsaturated group with a hydrophilic moiety include monomers having functional groups such as carboxyl, sulfo, hydroxyl, and phosphate groups, specifically, acrylic acid, methacrylic acid, crotonic acid, itaconic acid, itaconic acid monoesters, maleic acid, maleic acid monoesters, fumaric acid, fumaric acid monoesters, vinylsulfonic acid, styrenesulfonic acid, sulfonated vinylnaphthalene, vinyl alcohol, acrylamide, methacryloxyethyl phosphate, bis(methacryloxyethyl) phosphate, methacryloxyethylphenyl acid phosphate, ethylene glycol dimethacrylate, and diethylene glycol dimethacrylate.

Examples of monomers having an α,β-ethylenically unsaturated group with a hydrophobic moiety include styrene, styrene derivatives such as α-methylstyrene and vinyltoluene, vinylcyclohexane, vinylnaphthalene, vinylnaphthalene derivatives, alkyl acrylates, alkyl methacrylates, phenyl methacrylate, cycloalkyl methacrylates, alkyl crotonates, dialkyl itaconates, and dialkyl maleates.

Examples of copolymers serving as pigment dispersants include styrene-styrenesulfonic acid copolymers, styrene-maleic acid copolymers, styrene-methacrylic acid copolymers, styrene-acrylic acid copolymers, vinylnaphthalene-maleic acid copolymers, vinylnaphthalene-methacrylic acid copolymers, vinylnaphthalene-acrylic acid copolymers, alkyl acrylate-acrylic acid copolymers, alkyl methacrylate-methacrylic acid copolymers, styrene-alkyl methacrylate-methacrylic acid copolymers, styrene-alkyl acrylate-acrylic acid copolymers, styrene-phenyl methacrylate-methacrylic acid copolymers, and styrene-cyclohexyl methacrylate-methacrylic acid copolymers. These polymers may be copolymerized with monomers having functional groups such as polyoxyethylene and hydroxyl groups.

These polymer dispersants may have a weight average molecular weight of, for example, 2,000 to 50,000.

Examples of anionic surfactants and cationic surfactants are described later.

These pigment dispersants may be used alone or in combination. These pigment dispersants are typically added in a total amount of 0.1% to 100% by mass of the pigment, although it varies largely depending on the type of pigment.

Pigments that are self-dispersible in water (hereinafter referred to as "self-dispersible pigment") may also be used.

Self-dispersible pigments have numerous water-soluble groups on the surface thereof. These water-soluble groups allow the pigments to be dispersed in water without a polymer dispersant. Specifically, self-dispersible pigments are obtained by subjecting normal pigments to surface treatment processes such as acid/base treatment, coupling agent treatment, polymer grafting treatment, plasma treatment, and oxidation/reduction treatment.

In addition to surface-treated pigments, commercially available self-dispersible pigments may also be used, including Cab-o-jet-200, Cab-o-jet-300, IJX-157, IJX-253, IJX-266, IJX-273, IJX-444, IJX-55, and Cabot 260 available from Cabot Corporation; and Microjet Black CW-1 and CW-2 available from Orient Chemical Industries Co., Ltd.

Preferably, self-dispersible pigments include pigments having at least sulfo, sulfonate, carboxyl, or carboxylate groups on the surface thereof. Pigments having at least carboxyl or carboxylate groups on the surface thereof are more preferable.

Resin-coated pigments may also be used. These pigments, also known as microencapsulated pigments, are available from manufacturers such as DIC Corporation and Toyo Ink Co., Ltd.

Resin-dispersed pigments may also be used. These pigments have polymeric materials physically adsorbed or chemically bound thereto.

Other examples of pigments include black pigments; cyan, magenta, and yellow pigments; pigments of particular colors such as red, green, blue, brown, and white; metallic pigments such as gold and silver pigments; extender pigments such as colorless and tinted pigments; and plastic pigments.

Other examples of pigments include particles, such as silica, alumina, or polymer beads, having dyes or pigments deposited on the surface thereof; insoluble lake dyes; colored emulsions; and colored latexes.

Examples of colorants other than pigments include hydrophilic dyes such as anionic dyes, direct dyes, cationic dyes, reactive dyes, and polymer dyes; oil-soluble dyes; dye-colored wax powders, resin powders, and emulsions; fluorescent dyes and pigments; infrared absorbers (excluding compounds represented by general formula (I)); UV absorbers; magnetic materials, including ferromagnetic materials, such as ferrite and magnetite; semiconductors and photocatalysts such as titanium oxide and zinc oxide; and other organic and inorganic electronic materials.

The colorant may have a volume average particle size of, for example, 10 to 1,000 nm.

The volume average particle size of the colorant is the particle size of the colorant itself; if the colorant has additives, such as dispersants, deposited thereon, the volume average particle size of the colorant is the total particle size of the colorant and the additives deposited thereon. The volume average particle size may be measured using a Microtrac UPA 9340 particle size analyzer (available from Leeds & Northrup Company) as follows. A sample cell containing 4 mL of ink is subjected to a predetermined measurement procedure. The measurement parameters are as follows: the viscosity is the viscosity of the ink, and the density of the dispersed particles is the density of the colorant.

The colorant may be present in an amount (concentration) of, for example, 5% to 30% by mass of the ink.

Infrared Absorber

The aqueous ink according to this exemplary embodiment contains a compound represented by general formula (I) as an infrared absorber.

In general formula (I), $R^a$ is a group represented by general formula (I-R).

The group represented by general formula (I-R) preferably has a total of six or less carbon atoms, more preferably five or less carbon atoms, even more preferably four or less carbon atoms, most preferably three carbon atoms. The group represented by general formula (I-R) has a total of at least three carbon atoms.

In general formula (I-R), $R^e$ is hydrogen or methyl, preferably methyl. If $R^e$ in general formula (I-R) is methyl, the group represented by general formula (I-R) has a three-branched (i.e., tertiary) end structure, which may be more effective in reducing the decrease in infrared absorption performance than a group of general formula (I-R) where $R^e$ is hydrogen. This is presumably because a group of general formula (I-R) where $R^e$ is methyl is bulkier than a group of general formula (I-R) where $R^e$ is hydrogen and may therefore be more effective in inhibiting the decomposition of the compound represented by general formula (I).

In general formula (I-R), e is an integer of 0 to 3, preferably 0 to 2, more preferably 0 or 1, even more preferably 0. As e in general formula (I-R) becomes smaller, the infrared absorber may exhibit a smaller decrease in infrared absorption performance. This is presumably because, as e becomes smaller, the branched moiety of the group represented by general formula (I-R) becomes closer to the squarylium structure of the compound represented by general formula (I) and may thus reduce the likelihood of the factors responsible for decomposition (e.g., alkaline solvents, water, dispersants, and surfactants) acting on the molecules of the compound represented by general formula (I), which may result in less decomposition.

Examples of groups represented by general formula (I-R) include i-propyl, t-butyl, i-butyl (2-methylpropan-1-yl), i-pentyl (3-methylbutan-1-yl), t-pentyl (2,2-dimethylpropan-1-yl), i-hexyl (4-methylpentan-1-yl), t-hexyl (3,3-dimethylbutan-1-yl), and t-heptyl (4,4-dimethylpentan-1-yl), preferably i-propyl, t-butyl, and i-butyl (2-methylpropan-1-yl), more preferably t-butyl.

In general formula (I), $R^b$, $R^c$, and $R^d$ are each independently alkyl. Preferably, at least one of $R^b$, $R^c$, and $R^d$ is a group represented by general formula (I-R). More preferably, each of $R^b$, $R^c$, and $R^d$ is a group represented by general formula (I-R). As the number of groups represented by general formula (I-R) in general formula (I) increases, the infrared absorber may exhibit a smaller decrease in infrared absorption performance. This is presumably because, as the number of groups represented by general formula (I-R) in general formula (I) increases, the compound represented by general formula (I) becomes bulkier and may thus reduce the likelihood of the factors responsible for decomposition (e.g., alkaline solvents, water, dispersants, and surfactants) acting on the molecules of the compound represented by general formula (I), which may result in less decomposition.

If one of $R^b$, $R^c$, and $R^d$ is a group represented by general formula (I-R), that is, if the compound represented by general formula (I) has two groups represented by general formula (I-R), the groups represented by general formula (I-R) may be $R^a$ and $R^b$ or may be $R^a$ and $R^c$ or $R^d$.

If two or more of $R^a$ to $R^d$ are groups represented by general formula (I-R), the groups represented by general formula (I-R) may have the same or different structures. If at least one of $R^b$, $R^c$, and $R^d$ is a group represented by general formula (I-R), it may have any of the structures mentioned above.

If at least one of $R^b$, $R^c$, and $R^d$ in general formula (I) is an alkyl group other than those represented by general formula (I-R), the alkyl group may be linear, branched, or cyclic. The alkyl group may have a larger number of branches and a shorter carbon chain. The alkyl group preferably has 1 to 20 carbon atoms, more preferably 1 to 8 carbon atoms, even more preferably 1 to 6 carbon atoms.

Examples of alkyl groups include methyl, ethyl, n-propyl, n-butyl, n-pentyl, n-hexyl, s-butyl (2-butyl), 2-methylbutan-2-yl, 3-methylbutan-2-yl, 3,3-dimethylbutan-2-yl, 3-pentyl, 2-methylpentan-3-yl, 3-methylpentan-3-yl, cyclopentyl, and cyclohexyl. If at least one of $R^b$, $R^c$, and $R^d$ in general formula (I) is an alkyl group other than those represented by general formula (I-R), the alkyl group is preferably 2-methylbutan-2-yl or 3-methylpentan-3-yl.

Non-limiting examples of compounds (Exemplary Compounds) represented by general formula (I) are illustrated below.

Examples of compounds having four groups represented by general formula (I-R) include the following compounds:

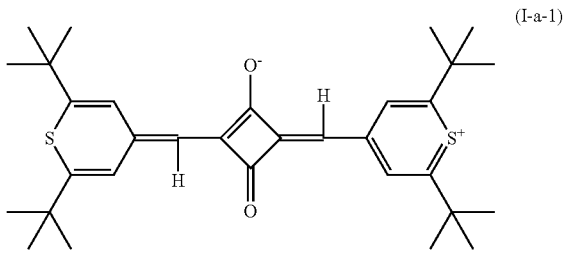

(I-a-1)

(I-a-2)
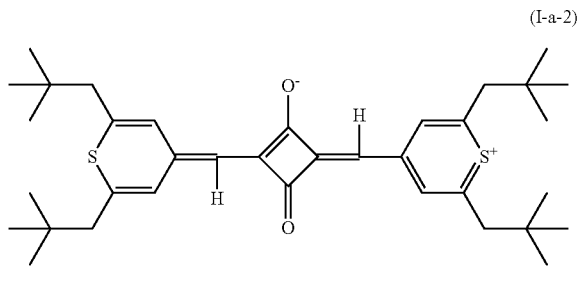
(I-a-7)
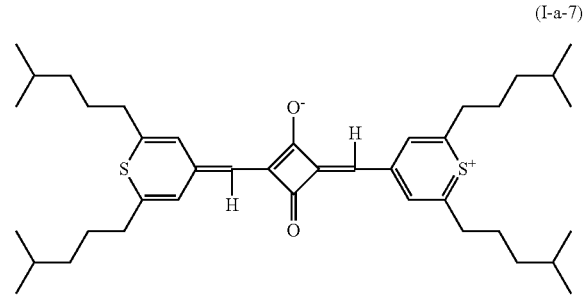
(I-a-3)
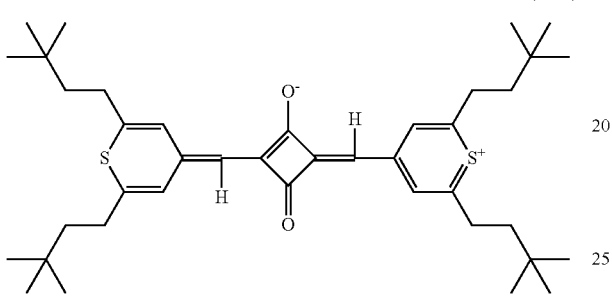
(I-b-1)
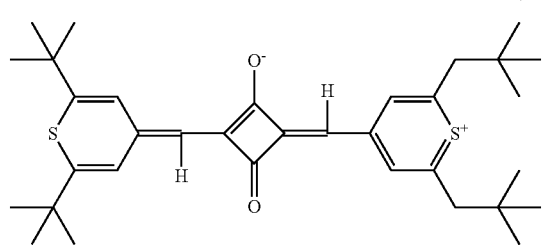
(I-a-4)
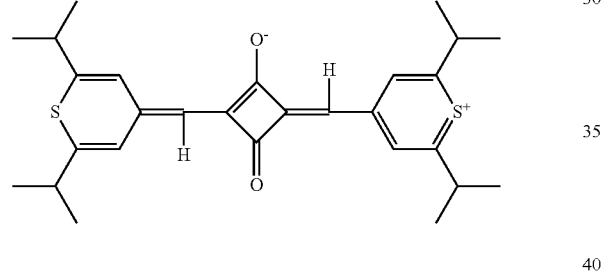
(I-b-2)
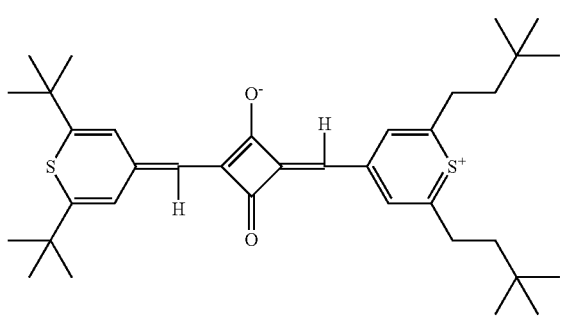
(I-a-5)
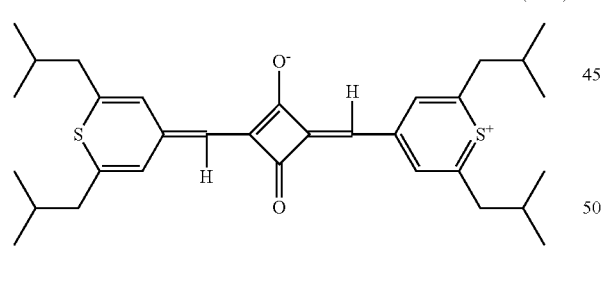
(I-b-3)
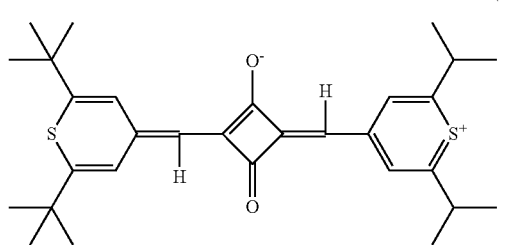
(I-a-6)
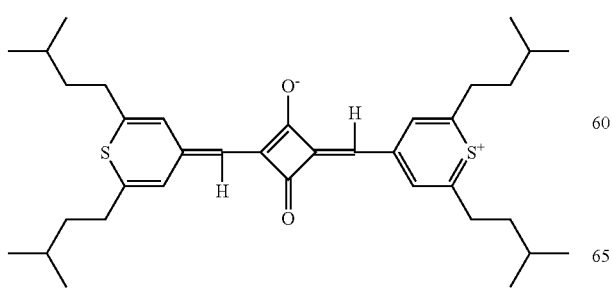
(I-b-4)
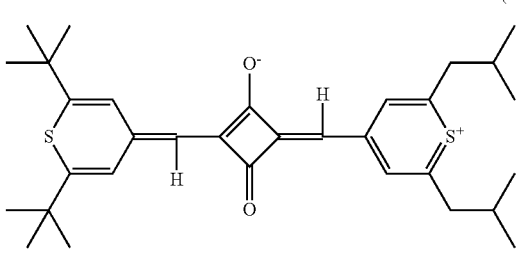

(I-b-5)
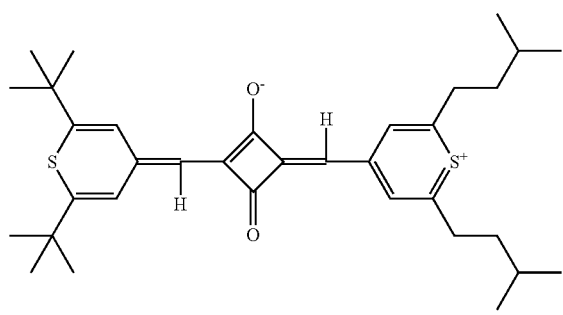
(I-b-6)
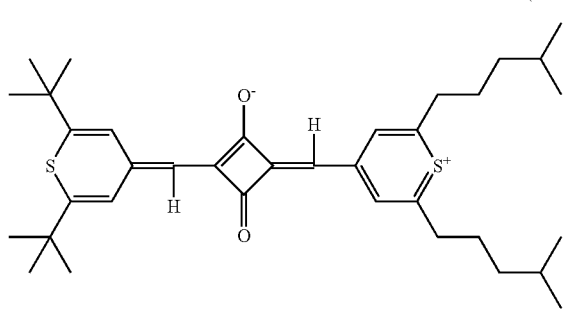
(I-b-7)
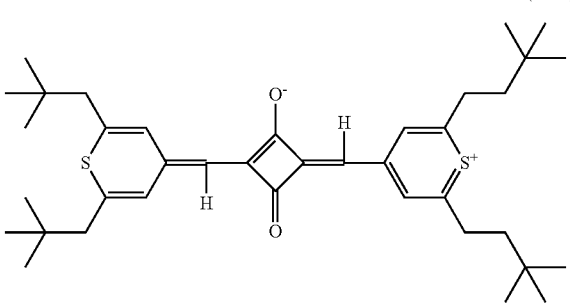
(I-b-8)
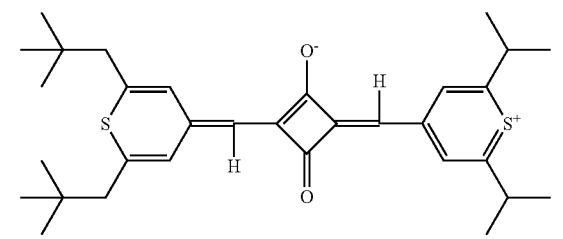
(I-b-9)
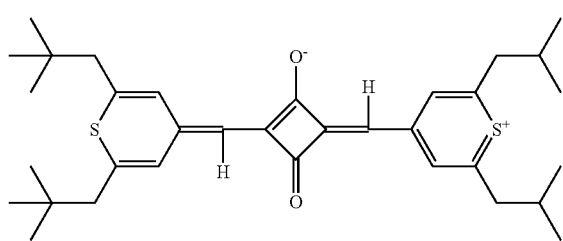
(I-b-10)
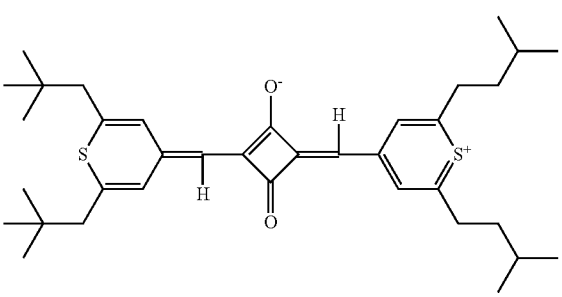
(I-b-11)
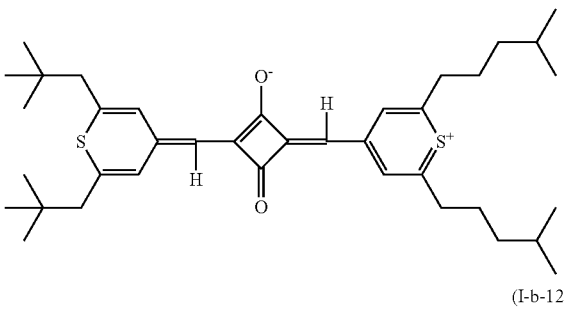
(I-b-12)
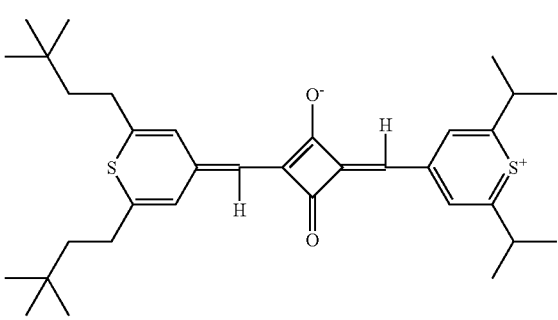
(I-b-13)
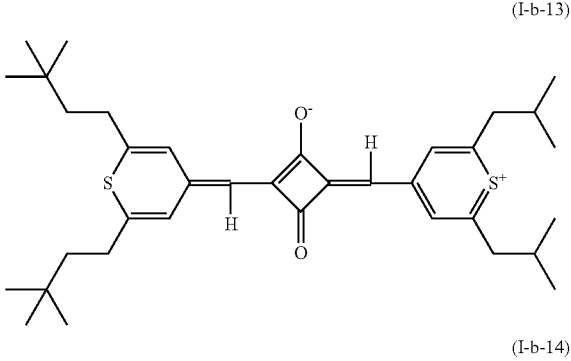
(I-b-14)
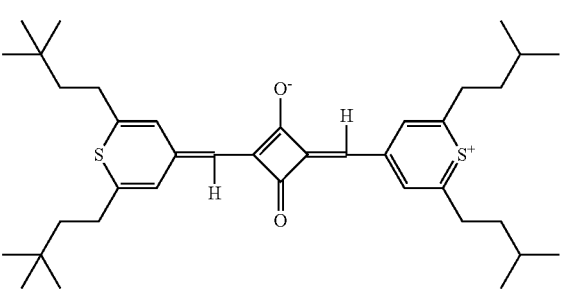

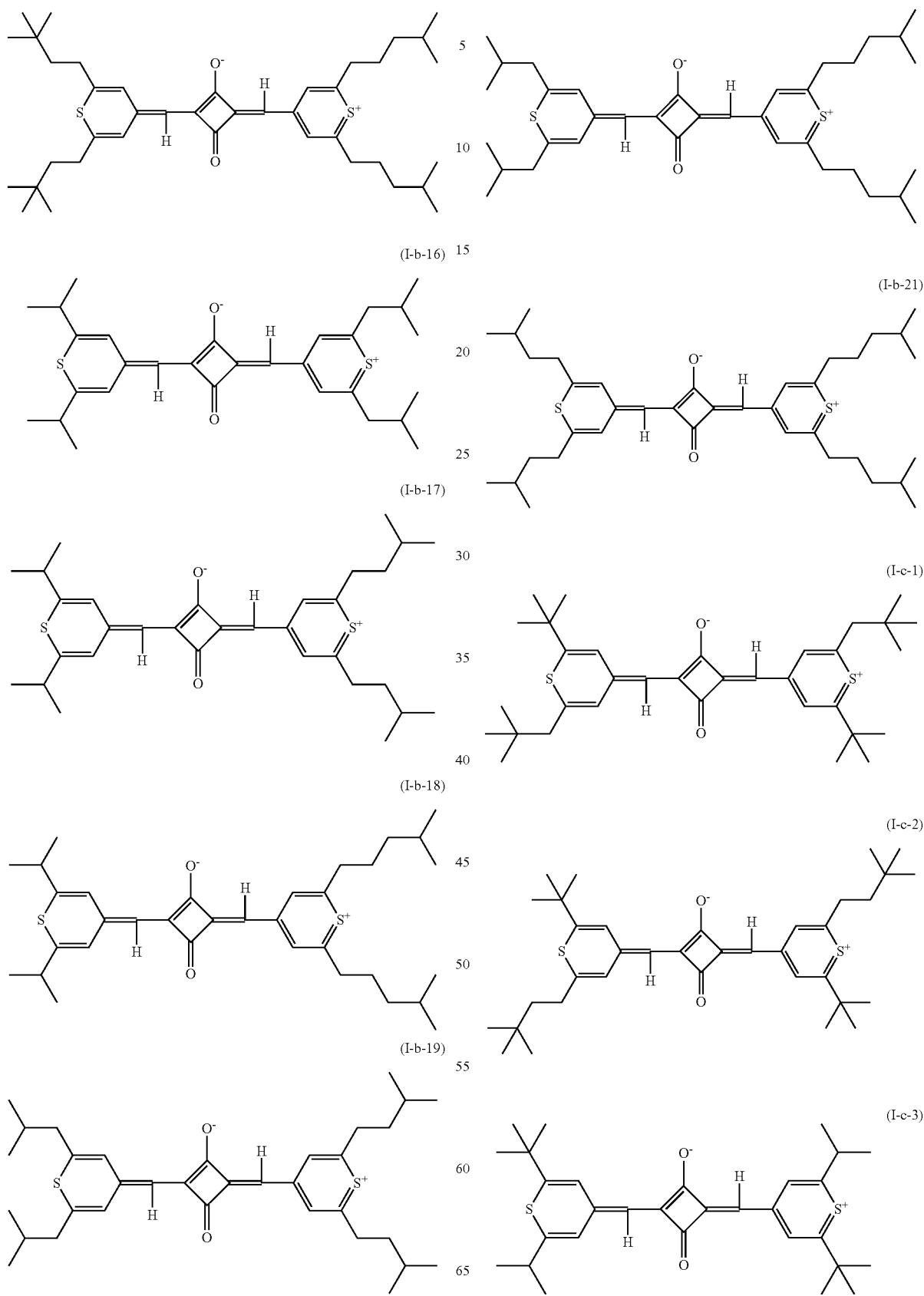

(I-c-4)
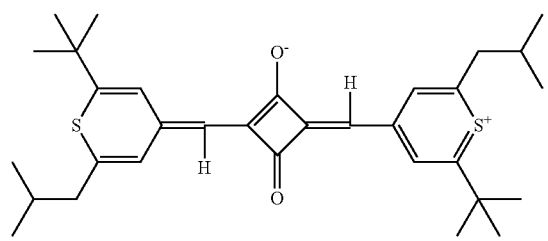
(I-c-5)
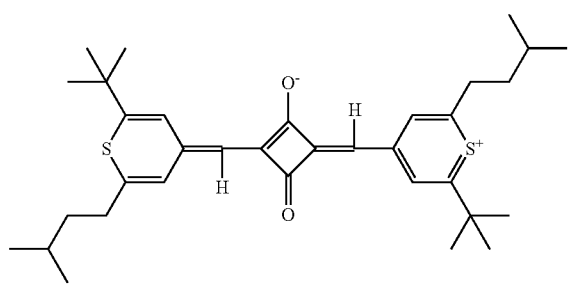
(I-c-6)
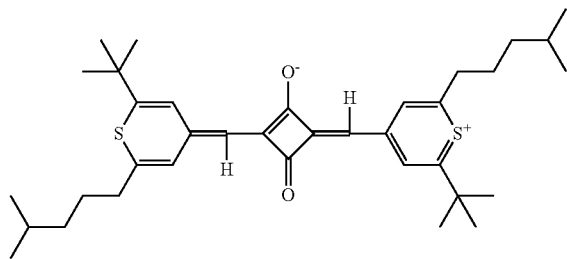
(I-c-7)
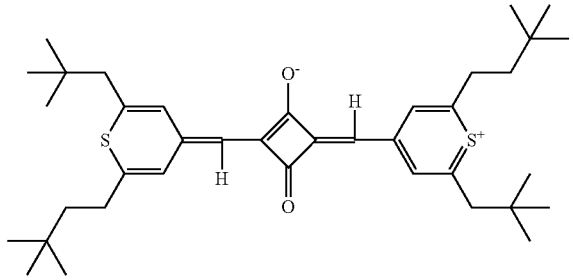
(I-c-8)
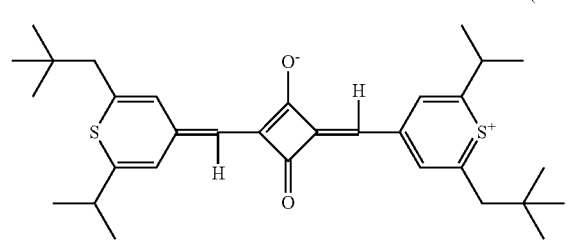
(I-c-9)
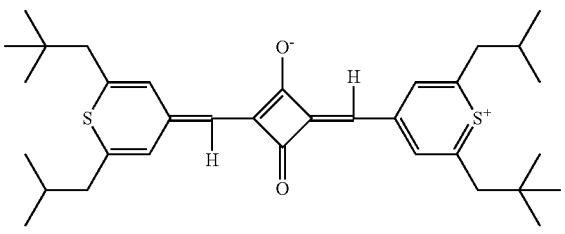
(I-c-10)
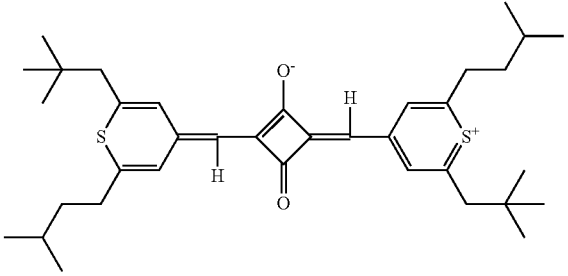
(I-c-11)
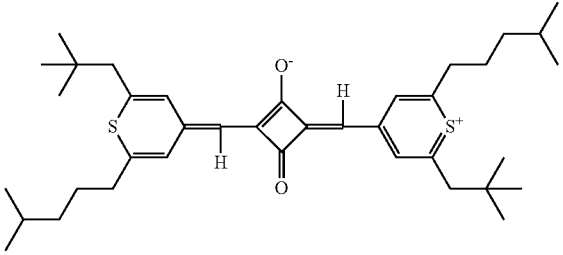
(I-c-12)
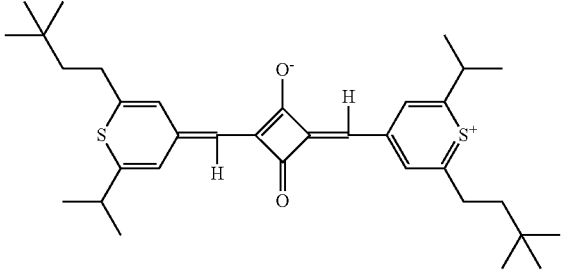
(I-c-13)
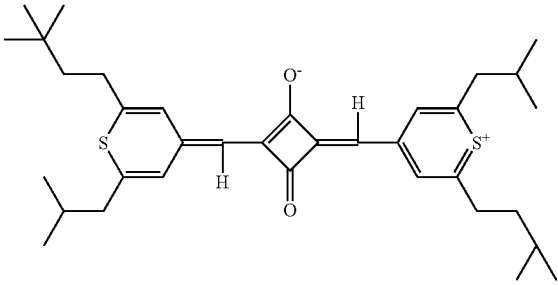

-continued
(I-c-14)
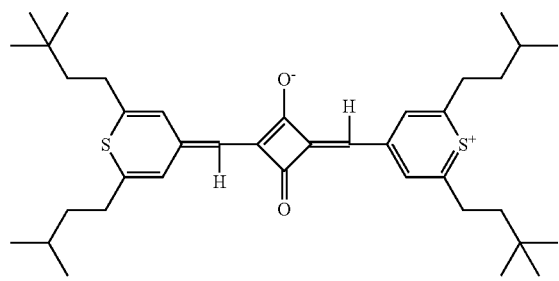
(I-c-15)
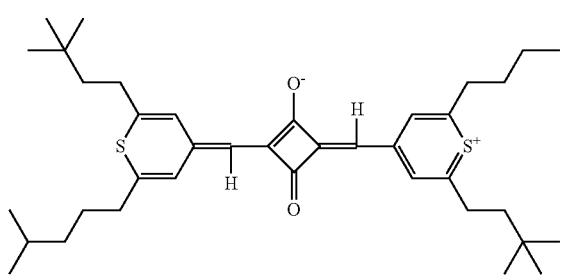
(I-c-16)
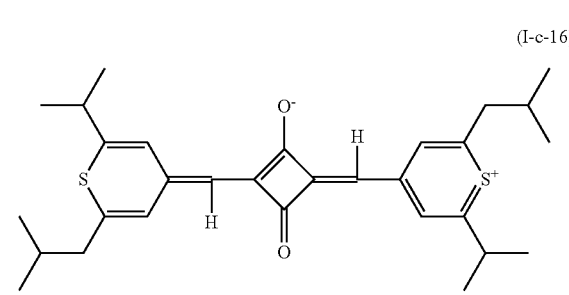
(I-c-17)
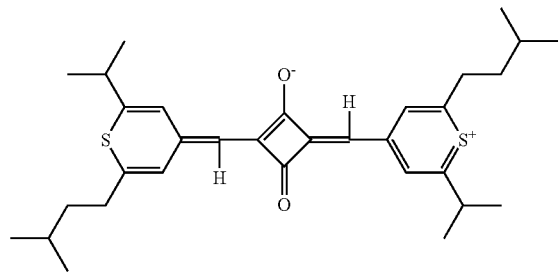
(I-c-18)
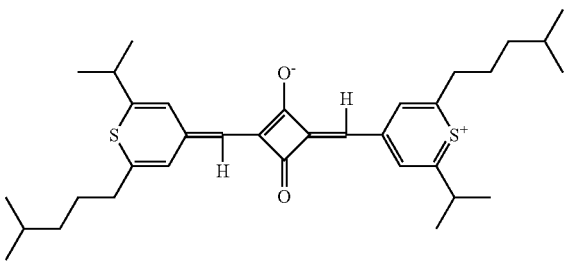
-continued
(I-c-19)
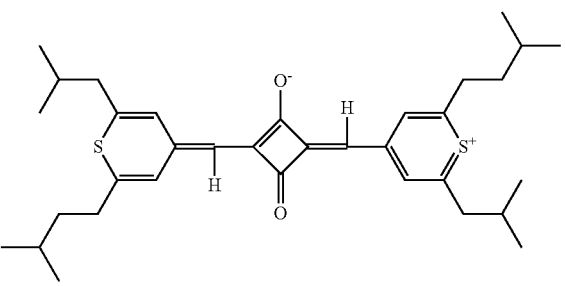
(I-c-20)
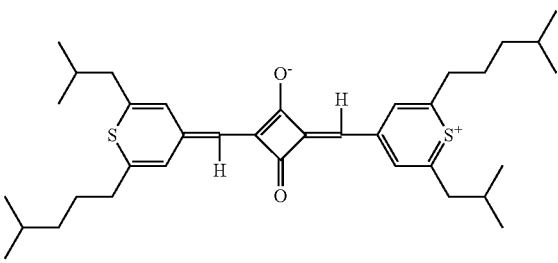
(I-c-21)
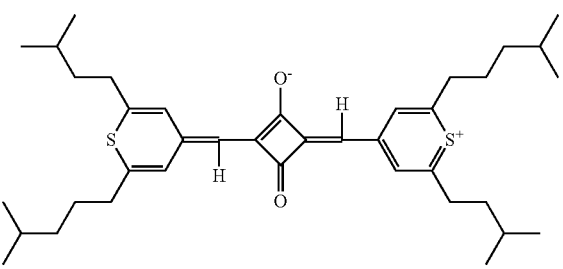
Examples of compounds having two groups represented by general formula (I-R) include the following compounds:
(I-d-1)
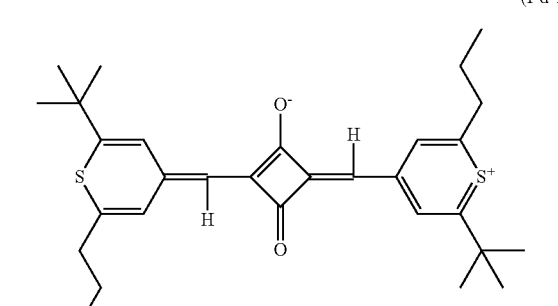
(I-d-2)
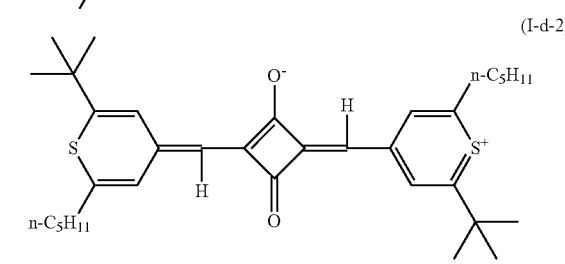

-continued (I-d-3)

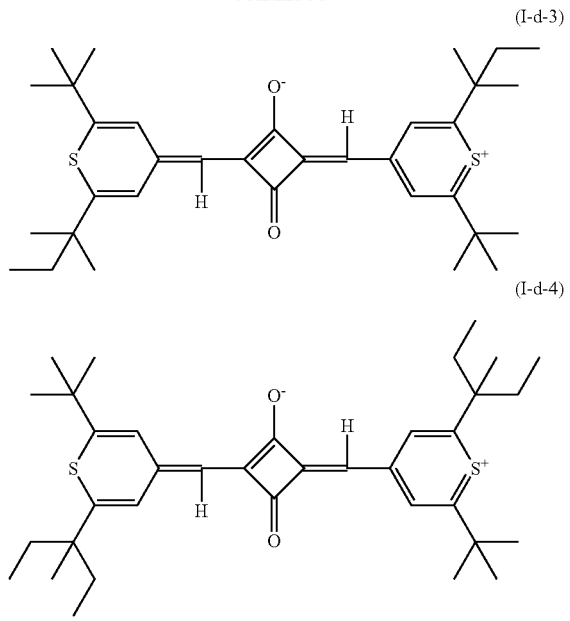

(I-d-4)

Exemplary Compounds (I-a-1) to (I-a-7), (I-b-1) to (I-b-6), and (I-c-1) to (I-c-6) are preferable among the above compounds represented by general formula (I), more preferably Exemplary Compounds (I-a-1), (I-b-3), and (I-c-3), most preferably Exemplary Compound (I-a-1).

Example synthesis schemes for compounds represented by general formula (I) will now be described.

Compound of General Formula (I) where all of $R^a$ to $R^d$ have Same Structure

A compound represented by general formula (I) may be synthesized, for example, by Scheme 1 below. Scheme 1 shows a synthesis route for Compound (I)-A, which is a compound of general formula (I) where all of $R^a$ to $R^d$ are groups represented by general formula (I-R) and having the same structure.

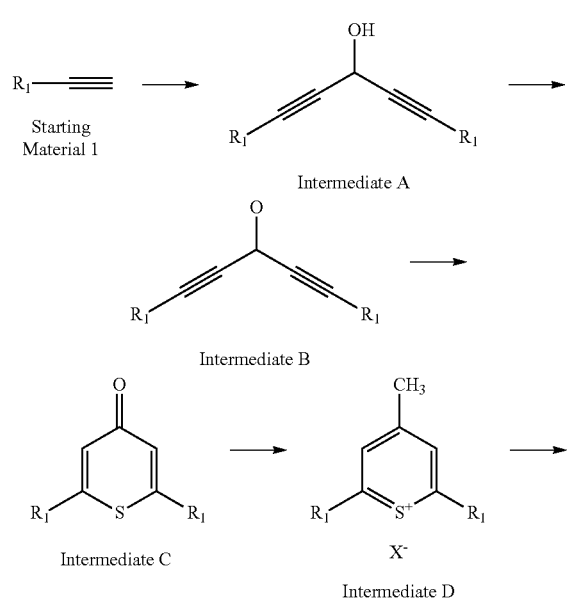

-continued

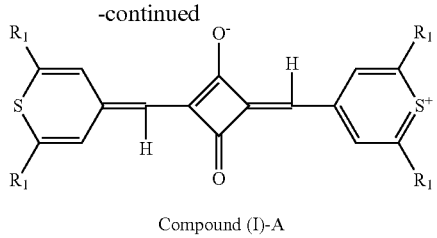

Compound (I)-A

Starting Material 1 is first added dropwise to a solution of an organomagnesium halide (Grignard reagent, e.g., ethylmagnesium chloride) in an organic solvent (e.g., tetrahydrofuran (THF)) and is reacted under cooling in an inert atmosphere. The mixture may then be returned to room temperature (e.g., 23° C. to 25° C.) or higher to complete the reaction. A formic acid derivative (e.g., ethyl formate) is then added dropwise and reacted under cooling. The mixture may then be returned to room temperature (e.g., 23° C. to 25° C.) or higher to complete the reaction. After the reaction is complete, the organic phase is extracted from the reaction mixture, and Intermediate A is collected from the separated organic layer.

Intermediate A and an oxidizing reagent (e.g., manganese oxide) are then added to a solvent (e.g., cyclohexane) and are reacted by heating under reflux. Any water generated during the reaction may be removed. Intermediate B is collected from the organic layer of the reaction mixture. Intermediate B may be purified.

Intermediate B is then subjected to an addition cyclization reaction. For example, sodium hydrosulfide n-hydrate is added to a solvent (e.g., ethanol), and Intermediate B is added dropwise under cooling. The solution is then reacted at room temperature (e.g., 23° C. to 25° C.). After the solvent is removed from the reaction solution, sodium chloride is added to saturation. The organic phase is separated, and Intermediate C is collected from the organic phase. Intermediate C may be purified.

A solvent (e.g., anhydrous THF) and Intermediate C are then mixed in an inert atmosphere, and a Grignard reagent (e.g., methylmagnesium bromide) is added dropwise. After the addition is complete, the reaction solution is heated under reflux. Ammonium bromide is then added dropwise under cooling. The organic layer is separated and concentrated by drying to obtain Intermediate D.

Intermediate D and squaric acid are then dispersed in a solvent (e.g., a mixture of cyclohexane and isobutyl alcohol) in an inert atmosphere. A basic compound (e.g., pyridine) is added, and the mixture is heated under reflux to obtain Compound (I)-A. Any water generated during the reaction may be removed. Compound (I)-A may be further subjected to processes such as purification, isolation, and concentration.

Compound of General Formula (I) where $R^a$ and $R^d$ have Same Structure and $R^b$ and $R^c$ have Same Structure A synthesis route for a compound of general formula (I) where $R^a$ and $R^d$ have the same structure and $R^b$ and $R^c$ have the same structure but have a different structure from $R^a$ and $R^d$ is illustrated below.

This compound is synthesized in the same manner as Compound (I)-A except that the step of synthesizing Intermediate A is replaced with the step indicated by Scheme 2:

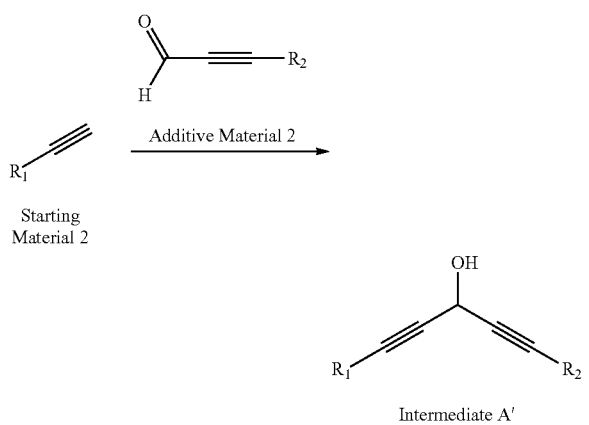

Starting Material 2

Intermediate A'

In Scheme 2, Starting Material 2 and Additive Material 2 are first added to a solution of a Grignard reagent (e.g., ethylmagnesium bromide) in an organic solvent (e.g., THF) and are reacted. After the reaction, a strong acid (e.g., hydrochloric acid) is added to the reaction solution under cooling. Ether is then added at room temperature (e.g., 23° C. to 25° C.), and Intermediate A' is collected from the organic layer. Intermediate A' may be purified.

The subsequent synthesis route is the same as in Scheme 1 except that Intermediate A is replaced with Intermediate A'.

Compound of General Formula (I) where $R^a$ and $R^b$ have Same Structure and $R^c$ and $R^d$ have Same Structure A compound of general formula (I) where $R^a$ and $R^b$ have the same structure and $R^c$ and $R^d$ have the same structure but have a different structure from $R^a$ and $R^b$ may be synthesized by preparing two types of Intermediate D that differ in the structure of $R_1$ as in the synthesis of Compound (I)-A, synthesizing the target compound as in Scheme 1 using the two types of Intermediate D, and purifying the resulting compound.

Compounds of general formula (I) where three of $R^a$ to $R^d$ have the same structure, compounds of general formula (I) where two of $R^a$ to $R^d$ have the same structure and the other two have different structures, and compounds of general formula (I) where all of $R^a$ to $R^d$ have different structures may be synthesized as in Schemes 1 and 2.

The peak absorption wavelength of the compound represented by general formula (I) in THF solution is preferably 760 to 1,200 nm, more preferably 780 to 1,100 nm, even more preferably 800 to 1,000 nm.

The molar extinction coefficient at the peak absorption wavelength of the compound represented by general formula (I) in THF solution is preferably 100,000 to 600,000 Lmol$^{-1}$ cm$^{-1}$, more preferably 200,000 to 600,000 Lmol$^{-1}$ cm$^{-1}$, even more preferably 250,000 to 600,000 Lmol$^{-1}$ cm$^{-1}$.

The compound represented by general formula (I) may be present as dispersed solids in the ink. The compound represented by general formula (I) present in the ink preferably has a mass average particle size of 10 to 1,000 nm, more preferably 10 to 500 nm, even more preferably 20 to 300 nm. The compound represented by general formula (I) may also be present as dispersed molecules in the ink.

The compound represented by general formula (I) may be present (dispersed) in the ink with a dispersant, described later.

In addition to the compound represented by general formula (I), the ink according to this exemplary embodiment may further contain known infrared absorbers, provided that they do not interfere with the properties, such as fixing, color-forming, and drying properties, of the ink.

Examples of known infrared absorbers include cyanines, merocyanines, benzenethiol metal complexes, mercaptophenol metal complexes, aromatic diamine metal complexes, diimmonium compounds, aminium compounds, nickel complexes, phthalocyanines, anthraquinones, naphthalocyanines, and croconium compounds.

Specific examples of known infrared absorbers include nickel complex infrared absorbers (e.g., SIR-130 and SIR-132 available from Mitsui Chemicals, Inc.), bis(dithiobenzyl)nickel (e.g., MIR-101 available from Midori Kagaku Co., Ltd.), bis[1,2-bis(p-methoxyphenyl)-1,2-ethylenedithiolato]nickel (e.g., MIR-102 available from Midori Kagaku Co., Ltd.), tetra-n-butylammoniumbis(cis-1,2-diphenyl-1,2-ethylenedithiolato)nickel (e.g., MIR-1011 available from Midori Kagaku Co., Ltd.), tetra-n-butylammoniumbis[1,2-bis(p-methoxyphenyl)-1,2-ethylenedithiolato]nickel (e.g., MIR-1021 available from Midori Kagaku Co., Ltd.), bis(4-tert-1,2-butyl-1,2-dithiophenolato)nickel-tetra-n-butylammonium (e.g., BBDT-NI available from Sumitomo Seika Chemicals Co., Ltd.), cyanine infrared absorbers (e.g., IRF-106 and IRF-107 available from Fujifilm Corporation), cyanine infrared absorbers (e.g., YKR2900 from Yamamoto Chemicals Inc.), aminium and diimmonium infrared absorbers (e.g., NIR-AM1 and IM1 available from Nagase ChemteX Corporation), immonium compounds (e.g., CIR-1080 and CIR-1081 available from Japan Carlit Co., Ltd.), aminium compounds (e.g., CIR-960 and CIR-961 available from Japan Carlit Co., Ltd.), anthraquinones (e.g., IR-750 from Nippon Kayaku Co., Ltd.), aminium compounds (e.g., IRG-002, IRG-003, and IRG-003K available from Nippon Kayaku Co., Ltd.), polymethines (e.g., IR-820B available from Nippon Kayaku Co., Ltd.), diimmonium compounds (e.g., IRG-022 and IRG-023 available from Nippon Kayaku Co., Ltd.), cyanines (e.g., CY-2, CY-4, and CY-9 available from Nippon Kayaku Co., Ltd.), soluble phthalocyanines (e.g., TX-305A available from Nippon Shokubai Co., Ltd.), naphthalocyanines (e.g., YKR5010 available from Yamamoto Chemicals Inc. and Sample 1 available from Sanyo Color Works, Ltd.), and inorganic materials such as ytterbium (e.g., UU-HP available from Shin-Etsu Chemical Co., Ltd.) and indium tin oxide (e.g., available from Sumitomo Metal Industries, Ltd.).

Diimmonium compounds and croconium compounds are preferable among these.

The infrared absorber described above (compound represented by general formula (I)) may be dispersed in the ink with a dispersant. Examples of dispersants include the pigment dispersants listed above.

The infrared absorber may be dispersed in the ink, for example, by preparing a dispersion of the infrared absorber with a dispersant and mixing the resulting dispersion with other ingredients.

The dispersion of the infrared absorber may be prepared, for example, by dissolving the infrared absorber and the dispersant in a solvent (e.g., THF, methyl ethyl ketone (MEK), or isopropyl alcohol (IPA)) and adding the solution dropwise to an aqueous solvent. Alternatively, the dispersion of the infrared absorber may be prepared by mixing the infrared absorber with a resin (e.g., polyethylene terephthalate (PET) or acrylic resin), milling the mixture in a disperser such as a ball mill, and dispersing the mixture in an aqueous solvent with a surfactant.

Aqueous Solvent

Examples of aqueous solvents include ion exchange water, ultrapure water, distilled water, and ultrafiltered water.

Water may be used in combination with lower alcohols such as methanol, ethanol, butanol, and IPA.

Other Additives

The aqueous ink according to this exemplary embodiment may contain other additives such as aqueous organic solvents.

Examples of aqueous organic solvents include polyhydric alcohols and derivatives thereof, nitrogen-containing solvents, alcohols, and sulfur-containing solvents.

Examples of polyhydric alcohols include ethylene glycol, diethylene glycol, propylene glycol, butylene glycol, triethylene glycol, 1,5-pentanediol, 1,2-hexanediol, 1,2,6-hexanetriol, glycerol, trimethylolpropane, sugar alcohols such as xylitol, and sugars such as xylose, glucose, and galactose Examples of derivatives of polyhydric alcohols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerol.

Examples of nitrogen-containing solvents include pyrrolidone, N-methyl-2-pyrrolidone, cyclohexylpyrrolidone, and triethanolamine.

Examples of alcohols include ethanol, IPA, butyl alcohol, and benzyl alcohol.

Examples of sulfur-containing solvents include thiodiethanol, thiodiglycerol, sulfolane, and dimethyl sulfoxide.

Other examples of aqueous organic solvents include propylene carbonate and ethylene carbonate.

The aqueous organic solvent may be present in an amount of, for example, 1% to 70% by mass of the ink.

Other examples of additives include surfactants.

Examples of surfactants include various anionic surfactants, nonionic surfactants, cationic surfactants, and amphoteric surfactants, preferably anionic surfactants and nonionic surfactants.

Specific examples of surfactants are illustrated below.

Examples of anionic surfactants include alkylbenzenesulfonic acid salts, alkylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, higher alkyl sulfosuccinate salts, polyoxyethylene alkyl ether carboxylate salts, polyoxyethylene alkyl ether sulfate salts, alkyl phosphate salts, and polyoxyethylene alkyl ether phosphate salts, preferably dodecylbenzenesulfonic acid salts, isopropylnaphthalenesulfonic acid salts, monobutylphenylphenol monosulfonate salts, monobutylbiphenylsulfonate salts, and dibutylphenylphenol disulfonate salts.

Examples of nonionic surfactants include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerol fatty acid esters, polyoxyethylene glycerol fatty acid esters, polyglycerol fatty acid esters, sucrose fatty acid esters, polyoxyethylene alkylamines, polyoxyethylene fatty acid amides, alkylalkanolamides, polyethylene glycol-polypropylene glycol block copolymers, acetylene glycol, and polyoxyethylene adducts of acetylene glycol, preferably polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, polyethylene glycol-polypropylene glycol block copolymers, acetylene glycol, and polyoxyethylene adducts of acetylene glycol.

Other examples include silicone surfactants such as oxyethylene adducts of polysiloxane; fluorinated surfactants such as perfluoroalkylcarboxylic acid salts, perfluoroalkylsulfonic acid salts, and oxyethylene perfluoroalkyl ethers; and biosurfactants such as spiculisporic acid, rhamnolipids, and lysolecithin.

These surfactants may be used alone or in a mixture. A surfactant having a hydrophilic-lipophilic balance (HLB) of 3 to 20 may be used for reasons such as solubility.

The surfactant may be present in an amount of 0.001% to 5% by mass (preferably 0.01% to 3% by mass).

Other examples of additives include penetrants for controlling permeability; compounds for improving the ease of application of the ink, such as polyethyleneimine, polyamines, polyvinylpyrrolidone, polyethylene glycol, ethylcellulose, and carboxymethylcellulose; alkali metal compounds for controlling conductivity and pH, such as potassium hydroxide, sodium hydroxide, and lithium hydroxide; and other optional additives such as pH buffers, antioxidants, fungicides, viscosity modifiers, conductors, UV absorbers, and chelating agents.

Ink Properties

The aqueous ink according to this exemplary embodiment may have a pH of, for example, 7 or more (preferably 7 to 11, more preferably 8 to 10).

The pH of the ink may be measured at a temperature of 23±0.5° C. and a humidity of 55±5% RH using a pH/conductivity meter (e.g., MPC227 available from Mettler-Toledo International Inc.).

The aqueous ink according to this exemplary embodiment may have a surface tension of, for example, 20 to 40 mN/m (preferably 25 to 35 mN/m).

The surface tension may be measured at 23° C. and 55% RH using a Wilhelmy plate tensiometer (e.g., those available from Kyowa Interface Science Co., Ltd.).

The aqueous ink according to this exemplary embodiment may have a conductivity of, for example, 0.01 to 0.5 S/m (preferably 0.01 to 0.25 S/m, more preferably 0.01 to 0.20 S/m).

The conductivity may be measured using a pH/conductivity meter (e.g., MPC227 available from Mettler-Toledo International Inc.).

The aqueous ink according to this exemplary embodiment may have a viscosity of, for example, 1.5 to 30 mPa·s (preferably 3 to 20 mPa·s).

The viscosity may be measured at a measurement temperature of 23° C. and a shear rate of 1,400 s$^{-1}$ using a viscometer (e.g., Rheomat 115 available from Contraves).

Method for Manufacturing Ink

The aqueous ink according to this exemplary embodiment may be manufactured by mixing the infrared absorber (compound represented by general formula (I)) with other ingredients.

For example, as described above, the aqueous ink according to this exemplary embodiment may be manufactured by preparing a dispersion of the infrared absorber with a dispersant and mixing the resulting dispersion with other ingredients.

The ingredients may be mixed using a disperser. Examples of dispersers include ultrasonic dispersers, ball mills containing bead media such as glass beads and zirconia beads, sand mills, horizontal media mills, and colloid mills. These dispersers may be used alone or in combination. The ingredients may be mixed in any manner.

For example, the aqueous ink according to this exemplary embodiment may be mixed with a photocurable material (e.g., a UV-curable material) for use as a photocurable ink (e.g., a UV-curable ink). If the aqueous ink according to this exemplary embodiment is prepared as a photocurable ink, the photocurable ink may exhibit only a small decrease in infrared absorption performance after extended storage.

Ink Drying System and Method

An ink drying system according to an exemplary embodiment of the present invention includes an irradiation unit that irradiates the aqueous ink according to the foregoing exemplary embodiment on a recording medium with infrared radiation.

Examples of recording media include, but not limited to, paper, plastic films, metals, and ceramics.

An applying unit that applies the aqueous ink to the recording medium and the irradiation unit that irradiates the aqueous ink with infrared radiation are described later.

The ink drying system according to this exemplary embodiment executes an ink drying method including irradiating the aqueous ink according to the foregoing exemplary embodiment on a recording medium with infrared radiation.

Recording Apparatus and Method

A recording apparatus according to an exemplary embodiment of the present invention includes an applying unit that applies the aqueous ink according to the foregoing exemplary embodiment to a recording medium and an irradiation unit that irradiates the aqueous ink on the recording medium with infrared radiation. That is, the recording apparatus according to this exemplary embodiment is a recording apparatus including the ink drying system according to the foregoing exemplary embodiment.

The applying unit may be any type of unit capable of applying the aqueous ink to recording media. Examples of applying units include inkjet ejection units (e.g., recording heads); coating units such as rollers, sprays, and sponges; and printing units such as gravure printing units, screen printing units, offset printing units, and letterpress printing units.

The irradiation unit, which emits infrared radiation, in the recording apparatus according to this exemplary embodiment serves as a drying unit that dries the aqueous ink on the recording medium. Specifically, when the irradiation unit in the recording apparatus according to this exemplary embodiment irradiates the aqueous ink on the recording medium with infrared radiation, the infrared absorber present in the aqueous ink absorbs some of the infrared radiation and generates heat. The resulting heat raises the temperature of the aqueous ink and thus dries the ink.

The recording apparatus may include other drying units in addition to the irradiation unit. Examples of other drying units include known drying devices (e.g., heaters, fans, and heating drums).

The recording apparatus according to this exemplary embodiment executes a recording method including applying the aqueous ink according to the foregoing exemplary embodiment to a recording medium and irradiating the aqueous ink on the recording medium with infrared radiation.

The recording apparatus according to this exemplary embodiment may include an ink cartridge attachable to and detachable from the recording apparatus and containing the aqueous ink according to the foregoing exemplary embodiment.

The recording apparatus according to this exemplary embodiment will now be described with reference to the drawings.

Figure 2:
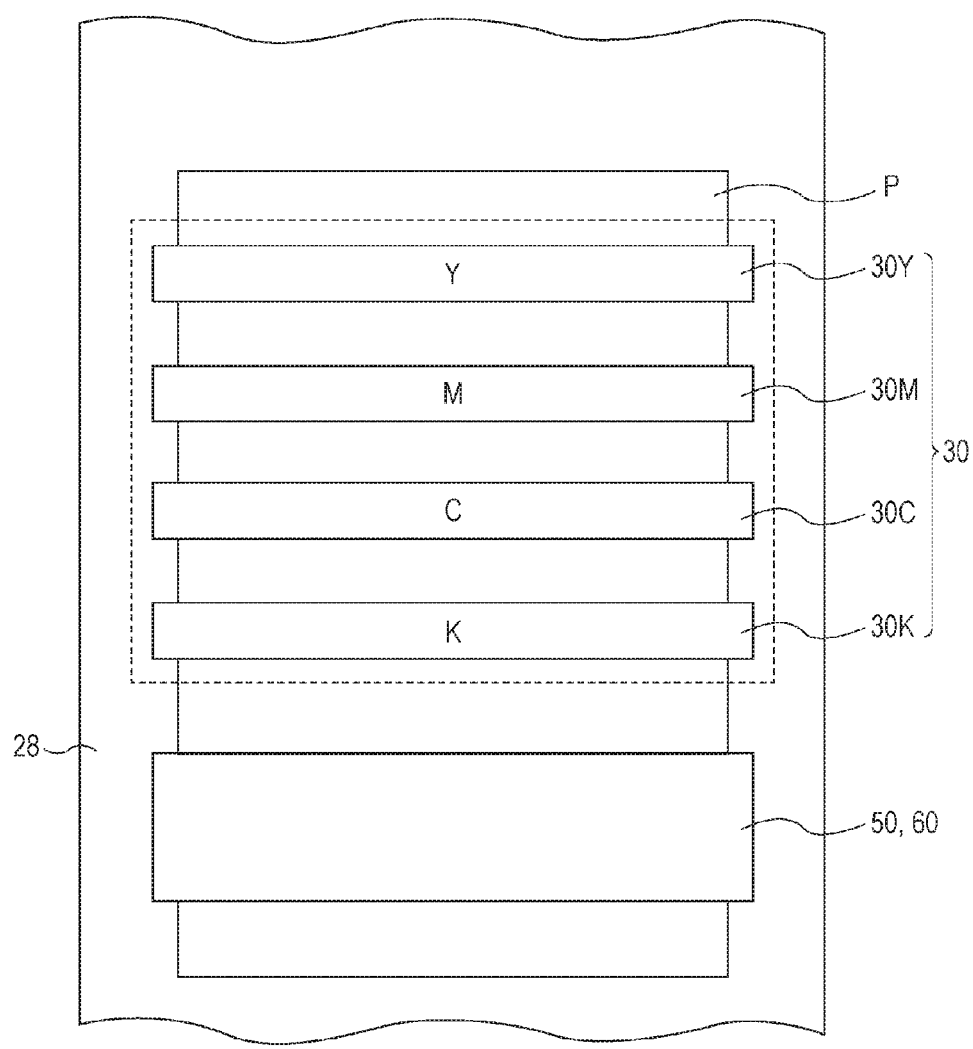
FIG. 2 is a partial plan view of the inkjet recording apparatus according to the exemplary embodiment of the invention, showing the area around recording heads.

FIG. 1 is a schematic view of an inkjet recording apparatus (an example of a recording apparatus) according to this exemplary embodiment. FIG. 2 is a partial plan view of the inkjet recording apparatus according to this exemplary embodiment, showing the area around recording heads.

As shown in FIG. 1, an inkjet recording apparatus 12 (hereinafter also referred to as "recording apparatus 12") according to this exemplary embodiment includes, for example, an input tray 16 disposed at the bottom of a housing 14 and a pickup roller 18 configured to pick a sheet P (an example of a recording medium) from a stack of sheets P in the input tray 16. The picked sheet P is transported by pairs of feed rollers 20 forming a feed path 22.

An endless transport belt 28 is disposed above the input tray 16 and is tensioned and supported by a drive roller 24 and a driven roller 26. Disposed above the transport belt 28 are, for example, four recording heads 30Y, 30M, 30C, and 30K (hereinafter collectively referred to as "recording heads 30") corresponding to yellow (Y), magenta (M), cyan (C), and black (K), respectively. The recording heads 30 are disposed opposite a flat portion of the transport belt 28 forming an ejection area where ink droplets are ejected (applied) from the recording heads 30. The sheet P transported by the pairs of feed rollers 20 is supported by the transport belt 28 and is transported to the ejection area, where ink droplets are ejected from the recording heads 30 onto the sheet P located opposite the recording heads 30 based on image information.

The recording heads 30 are connected via supply tubes (not shown) to four ink cartridges 31Y, 31M, 31C, and 31K (hereinafter collectively referred to as "ink cartridges 31") corresponding to yellow (Y), magenta (M), cyan (C), and black (K), respectively. The ink cartridges 31 are attachable to and detachable from the inkjet recording apparatus 12 and supply inks of different colors to the recording heads 30.

A charging roller 32 is disposed upstream of the recording heads 30 (upstream in the transport direction of the sheet P). The charging roller 32 is rotated while the transport belt 28 and the sheet P are held between the charging roller 32 and the driven roller 26. A potential difference generated between the charging roller 32 and the driven roller 26, which is grounded, applies electric charge to the sheet P. The sheet P is thereby electrostatically attracted to the transport belt 28.

An ink drying system 60 is disposed above the transport belt 28 downstream of the recording heads 30 (downstream in the transport direction of the sheet P).

The ink drying system 60 includes an infrared irradiation device 50 (an example of an irradiation unit) that irradiates the four inks applied to the sheet P by the four recording heads 30 with infrared radiation.

The infrared irradiation device 50 in the ink drying system 60 according to this exemplary embodiment serves as a drying unit that dries the four inks applied to the sheet P. The infrared irradiation device 50 dries the ink applied to the sheet P on the transport belt 28 by irradiation with infrared radiation. The details of the infrared irradiation device 50 are described later.

A release plate 34 is disposed downstream of the recording heads 30 (downstream in the transport direction of the sheet P) to release the sheet P from the transport belt 28. The released sheet P is transported downstream of the release plate 34 (downstream in the transport direction of the sheet P) by pairs of output rollers 38 forming an output path 36 and is output to an output tray 40 disposed at the top of the housing 14.

The recording heads 30 will now be described.

For example, as shown in FIG. 2, the recording heads 30 are elongated recording heads. The length of the effective recording area (the area where ink ejection nozzles are arranged) of the recording heads 30 is greater than or equal to the width of the sheet P (the size of the sheet P in a direction crossing (e.g., perpendicular to) the transport direction of the sheet P).

It should be understood, however, that the recording heads 30 need not necessarily be elongated recording heads, but may instead be recording heads shorter than the width of the sheet P. This type of recording head (i.e., a carriage-type recording head) ejects ink while moving in the width direction of the sheet P.

The recording heads 30 may be known recording heads. For example, the recording heads 30 may be thermal recording heads, which eject ink droplets with heat, or piezoelectric recording heads, which eject ink droplets with pressure.

The recording heads 30, for example, the four recording heads 30Y, 30M, 30C, and 30K corresponding to yellow (Y), magenta (M), cyan (C), and black (K), are arranged in the transport direction so as to be parallel to each other. It should be understood, however, that the four recording heads 30 corresponding to the four colors need not necessarily be provided; depending on the purpose, a single recording head 30 corresponding to black (K) may be provided, or more than four recording heads 30 corresponding to more than four colors including intermediate colors may be provided.

The infrared irradiation device 50 will now be described.

For example, as shown in FIG. 2, the infrared irradiation device 50 is an elongated infrared irradiation device. The length of the effective infrared irradiation area (the area where infrared light sources are arranged) of the infrared irradiation device 50 is greater than or equal to the width of the area where recording can be performed by the recording heads 30 (the size of that area in a direction crossing (e.g., perpendicular to) the transport direction of the sheet P).

It should be understood, however, that the infrared irradiation device 50 need not necessarily be an elongated infrared irradiation device, but may instead be an infrared irradiation device shorter than the width of the area where recording can be performed by the recording heads 30. This type of infrared irradiation device (i.e., a carriage-type infrared irradiation device) emits infrared radiation while moving in the width direction of the area where recording can be performed by the recording heads 30.

Examples of light sources for the infrared irradiation device 50 include light-emitting diodes (LEDs), laser diodes (LDs) (e.g., vertical-cavity surface-emitting lasers (VC-SELs)), halogen lamps, and xenon lamps.

Preferably, light sources for the infrared irradiation device 50 include LDs, more preferably high-power VCSELs.

The infrared irradiation conditions for the infrared irradiation device 50 vary depending on factors such as the infrared absorption performance of the infrared absorber present in the ink and the water content of the ink. For example, the water content of the ink deposited on the sheet P may be assumed to be 10% by mass or less, and the temperature may be assumed to be 80° C. to 200° C.

Example infrared irradiation conditions are as follows: the center wavelength is 700 to 1,200 nm (preferably 780 to 980 nm), the irradiation intensity is 0.1 to 10 J/cm$^2$ (preferably 1 to 3 J/cm$^2$), and the irradiation time is 0.1 millisecond to 10 seconds (preferably 10 to 100 milliseconds).

The operation of the recording apparatus 12 according to this exemplary embodiment will now be described.

In the recording apparatus 12 according to this exemplary embodiment, a sheet P is picked from the input tray 16 by the pickup roller 18 and is transported to the transport belt 28 via the feed path 22.

The sheet P is then electrostatically attracted to the transport belt 28 by the charging roller 32 and is transported under the recording heads 30 by the rotation of the transport belt 28.

The recording heads 30 then eject (apply) the inks to the sheet P to record the target image.

The infrared irradiation device 50 then irradiates the ink on the sheet P with infrared radiation. The infrared absorber present in the ink absorbs some of the infrared radiation and generates heat, thereby raising the temperature of the ink. This reduces the water content of the ink through evaporation and thus dries the ink.

The sheet P having the ink (ink image) deposited (formed) thereon is output to the output tray 40 via the output path 36.

In this way, the recording apparatus 12 according to this exemplary embodiment outputs a sheet P having ink (ink image) deposited (formed) thereon.

Since the infrared irradiation device 50 simultaneously irradiates inks of different colors on the sheet P with infrared radiation to dry the inks, the recording apparatus 12 according to this exemplary embodiment may involve low equipment cost.

A recording apparatus according to another exemplary embodiment will now be described.

Figure 3:
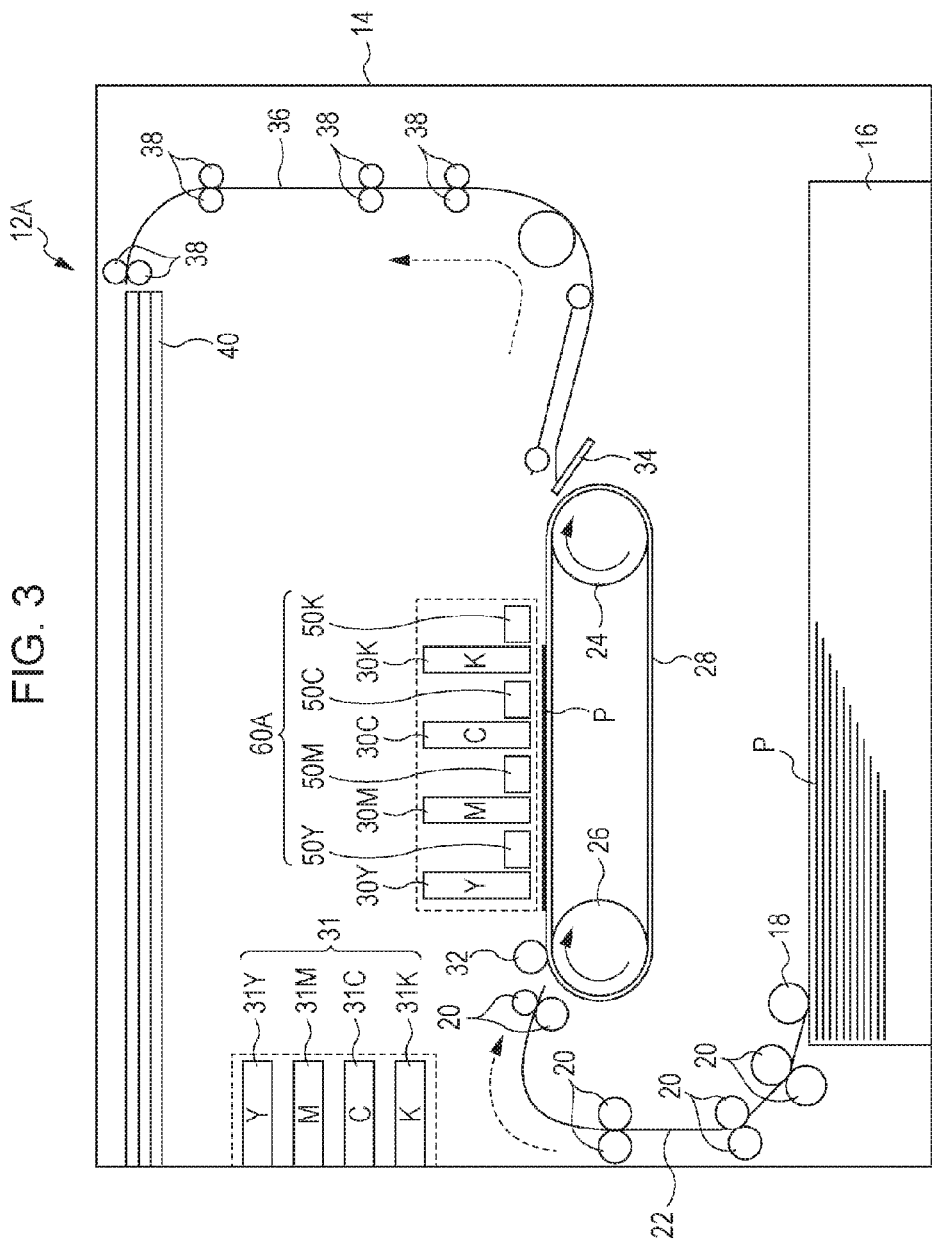
FIG. 3 is a schematic view of an inkjet recording apparatus according to another exemplary embodiment of the invention.

FIG. 3 is a schematic view of an inkjet recording apparatus 12A (an example of a recording apparatus) according to this exemplary embodiment. In the following description, the same parts as those of the recording apparatus 12 according to the foregoing exemplary embodiment are indicated by the same reference numerals to avoid duplication of description.

For example, as shown in FIG. 3, the inkjet recording apparatus 12A (hereinafter also referred to as "recording apparatus 12A") includes infrared irradiation devices 50Y, 50M, 50C, and 50K (examples of irradiation units) disposed downstream of the recording heads 30Y, 30M, 30C, and 30K, respectively. The four infrared irradiation devices 50Y, 50M, 50C, and 50K form an ink drying system 60A.

The operation of the recording apparatus 12A will now be described.

In the recording apparatus 12A, the recording heads 30Y, 30M, 30C, and 30K eject the inks to a sheet P transported under the recording heads 30, and the infrared irradiation devices 50Y, 50M, 50C, and 50K separately irradiate the inks with infrared radiation to dry the inks.

Since the infrared irradiation devices 50Y, 50M, 50C, and 50K separately irradiate inks on the sheet P with infrared radiation to dry the inks, the recording apparatus 12A according to this exemplary embodiment may cause less ink smear and mixing with other inks.

Other configurations may be used to implement infrared irradiation. For example, an infrared irradiation device (an example of an irradiation unit) may be disposed downstream of each set of two or more recording heads and may be used to irradiate inks ejected from those recording heads with infrared radiation. The foregoing configurations may also be used in combination to implement infrared irradiation.

Alternatively, integrated recording/drying heads may be formed, for example, by mounting recording heads and infrared irradiation devices in housings, and may be used to separately eject inks and irradiate the inks with infrared radiation to dry the inks.

The recording apparatuses 12 and 12A according to the foregoing exemplary embodiments may include, for example, an ink drying unit (e.g., a heater, fan, or heating drum) downstream of the infrared irradiation device 50 or 50K. The drying unit may be used in combination with the infrared irradiation device 50 or 50K to dry the ink deposited on the sheet P.

If the inks are photocurable inks, a light irradiation device (e.g., a UV irradiation device) may be disposed, for example, downstream of the infrared irradiation device 50 or 50K.

The foregoing exemplary embodiments should not be construed as limiting. It should be appreciated that various other exemplary embodiments are possible within the scope of the present invention.

EXAMPLES

The present invention is further illustrated by the following examples, although these examples are not intended to limit the present invention. In the following description, all parts and percentages are by mass unless otherwise specified.

Synthesis of Infrared Absorber
Synthesis of Compound (A6)

Compound (A6) (compound of general formula (I) where $R^a$ to $R^d$ are t-butyl) is synthesized by the following scheme.

A three-necked flask equipped with a Dean-Stark trap, a reflux condenser, a stirrer seal, and a stirrer bar is provided as a reaction vessel. In the reaction vessel are placed 2,2,8,8-tetramethyl-3,6-nonadiyn-5-ol and cyclohexane. To the reaction vessel is added powdered manganese(IV) oxide, and the mixture is heated under reflux with stirring using a Three-One Motor mixer. Any water generated during the reaction is removed by azeotropic distillation. It is determined by thin-layer chromatography that no 2,2,8,8-tetramethyl-3,6-nonadiyn-5-ol remains. After the reaction mixture is allowed to cool, it is filtered under reduced pressure to obtain a yellow filtrate (F1). The solid obtained by filtration is transferred to another vessel. Ethyl acetate is added, and the mixture is sonicated and filtered. This procedure is repeated four times to obtain an ethyl acetate extract (F2). The filtrate (F1) and the ethyl acetate extract (F2) are mixed together, and the mixture is concentrated using a rotary evaporator and then a vacuum pump to obtain an orange liquid. The orange liquid is distilled under reduced pressure to obtain a light yellow liquid (Intermediate 1).

A three-necked flask equipped with a thermometer and a dropping funnel is provided as a reaction vessel. Sodium hydrosulfide n-hydrate is added to ethanol, and the mixture is stirred at room temperature (20° C.) until the sodium hydrosulfide n-hydrate dissolves. The solution is then cooled in an ice bath. When the inner temperature reaches 5° C., a mixture of Intermediate 1 and ethanol is slowly added dropwise. During the addition, the yellow liquid turns orange. Since the inner temperature rises due to heat generation, the mixture is added dropwise at a controlled rate so that the inner temperature falls within the range of 5° C. to 7° C. After the addition, the ice bath is removed, and the reaction solution is allowed to warm to room temperature (20° C.) with stirring. Water is added to the reaction solution, and ethanol is removed using a rotary evaporator. Sodium chloride is added to saturation, and the organic phase is separated with ethyl acetate. The organic phase is washed twice with saturated ammonium chloride solution and is dried over magnesium sulfate. After the drying, the liquid is concentrated under reduced pressure to obtain a brown liquid. The brown liquid is distilled under reduced pressure. Although the distillate starts to run at 200° C., the fore-run contains no target compound; therefore, the main fraction is collected when the amount of vapor rises. A yellow liquid (Intermediate 2) is obtained.

A stirrer bar and Intermediate 2 are placed in a three-necked flask. The flask is equipped with a nitrogen inlet tube and a reflux condenser and is purged with nitrogen. Anhydrous THF is added using a syringe in a nitrogen atmosphere, and a 1 M solution of methylmagnesium bromide in THF is added dropwise using a syringe with stirring at room temperature (20° C.). After the addition is complete, the reaction solution is heated under reflux with stirring. After the reaction solution is allowed to cool in a nitrogen atmosphere, an aqueous solution of ammonium bromide is added dropwise under cooling in an ice bath. After the reaction mixture is further stirred at room temperature (20° C.), n-hexane is added, and the organic phase is dried over sodium sulfate. After the drying, the n-hexane/THF solution is removed using a syringe, and the inorganic layer is washed with ethyl acetate to obtain an extract. The n-hexane/THF solution and the extract obtained from the inorganic layer are mixed together. The mixture is concentrated under reduced pressure and is then dried in a vacuum to obtain Intermediate 3.

Intermediate 3 and squaric acid are dispersed in a mixture of cyclohexane and isobutyl alcohol in a nitrogen atmosphere. Pyridine is added, and the mixture is heated under reflux. Isobutyl alcohol is then added, and the reaction mixture is further heated under reflux. Any water generated during the reaction is removed by azeotropic distillation. After the reaction mixture is allowed to cool, it is filtered under reduced pressure to remove any insoluble component. The filtrate is concentrated using a rotary evaporator. Methanol is added to the residue, and the mixture is heated to 40° C. and is then cooled to −10° C. A crystalline product is obtained by filtration and is dried in a vacuum to obtain Compound (A6). Compound (A6) is identical to Exemplary Compound (I-a-1), which is a compound (squarylium compound) represented by general formula (I).

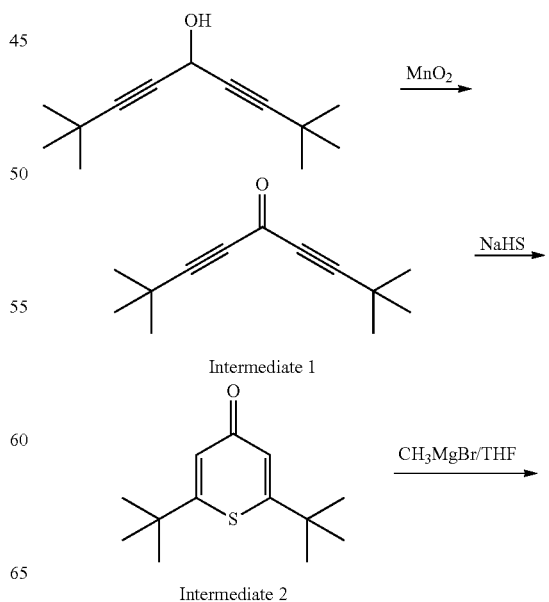

-continued

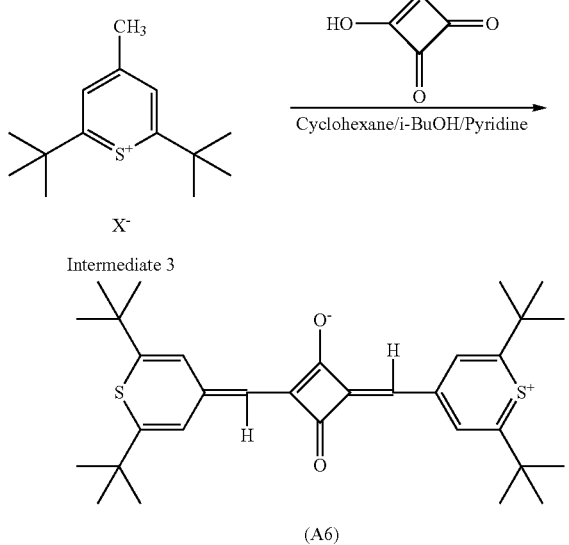

Intermediate 3

(A6)

Synthesis of Compound (A1)

Compound (A1) (compound of general formula (I) where $R^b$ and $R^c$ are n-propyl) is synthesized by the same procedure as Compound (A6) except that Intermediate 1 is replaced with an intermediate (hereinafter referred to as "Intermediate 1-2") having an n-propyl group at the position corresponding to one of the two t-butyl groups of Intermediate 1.

Intermediate 1-2 corresponds to Intermediate A' in the synthesis scheme (Scheme 2) for a compound of general formula (I) where $R^a$ and $R^d$ have the same structure and $R^b$ and $R^c$ have the same structure. Intermediate 1-2 is synthesized by Scheme 2 using Starting Material 2 where $R_1$ is t-butyl and Additive Material 2 where $R_2$ is n-propyl. Compound (A1) is identical to Exemplary Compound (I-d-1), which is a compound (squarylium compound) represented by general formula (I).

Synthesis of Compound (A2)

Compound (A2) (compound of general formula (I) where $R^b$ and $R^c$ are n-pentyl) is synthesized by the same procedure as Compound (A1) except that n-propyl is replaced with n-pentyl. Compound (A2) is identical to Exemplary Compound (I-d-2), which is a compound (squarylium compound) represented by general formula (I).

Synthesis of Compound (A3)

Compound (A3) (compound of general formula (I) where $R^a$ to $R^d$ are i-butyl) is synthesized by the same procedure as Compound (A6) except that 2,2,8,8-tetramethyl-3,6-nonadiyn-5-ol is replaced with 2,10-dimethyl-4,7-undecadiyn-6-ol. Compound (A3) is identical to Exemplary Compound (I-a-5), which is a compound (squarylium compound) represented by general formula (I).

Identification Data $^1$H-NMR spectrum (CDCl$_3$): 9.1 (2H), 6.8 (2H), 6.1 (2H), 2.4-2.6 (8H), 1.8-2.0 (4H), 0.8-1.0 (24H) Mass spectrum (FD): m/z=523

Synthesis of Compound (A4)

Compound (A4) (compound of general formula (I) where $R^a$ to $R^d$ are i-pentyl) is synthesized by the same procedure as Compound (A6) except that 2,2,8,8-tetramethyl-3,6-nonadiyn-5-ol is replaced with 2,12-dimethyl-5,8-tridecadiyn-7-ol. Compound (A4) is identical to Exemplary Compound (I-a-6), which is a compound (squarylium compound) represented by general formula (I).

Identification Data $^1$H-NMR spectrum (CDCl$_3$): 9.1 (2H), 6.8 (2H), 6.1 (2H), 2.5-2.7 (8H), 1.4-1.7 (12H), 0.7-1.1 (24H)

Mass spectrum (FD): m/z=579

Synthesis of Compound (A5)

Compound (A5) (compound of general formula (I) where $R^a$ to $R^d$ are t-pentyl) is synthesized by the same procedure as Compound (A6) except that 2,2,8,8-tetramethyl-3,6-nonadiyn-5-ol is replaced with 2,2,10,10-tetramethyl-4,7-undecadiyn-6-ol. Compound (A5) is identical to Exemplary Compound (I-a-2), which is a compound (squarylium compound) represented by general formula (I).

Synthesis of Comparative Compound (B1)

Compound (B1) (compound of general formula (I) where $R^a$ to $R^d$ are n-hexyl) is synthesized by the same procedure as Compound (A6) except that 2,2,8,8-tetramethyl-3,6-nonadiyn-5-ol is replaced with heptadeca-7,10-diyn-9-ol.

Synthesis of Comparative Compound (B2)

Compound (B2) (compound of general formula (I) where $R^a$ to $R^d$ are n-butyl) is synthesized by the same procedure as Compound (A6) except that 2,2,8,8-tetramethyl-3,6-nonadiyn-5-ol is replaced with trideca-5,8-diyn-7-ol.

Example 1

Preparation of Infrared Absorber Dispersion (1)

In a flask is weighed out and placed 20 mg of Compound (A1) (squarylium compound), serving as an infrared absorber. To the flask is added 2 mL of THF, and the mixture is stirred with a stirrer.

To the mixture is added 4 g of a 50% by mass solution of an acrylic polymer blend (D1 resin) having carboxyl end groups in MEK. The mixture is further mixed with 4 mL of MEK and is stirred. A 10% by mass aqueous sodium hydroxide solution is then added with stirring to neutralize 70% of all carboxyl groups present in the acrylic polymer blend (D1 resin).

After the neutralization is complete, 6 mL of water is added with stirring.

After water is added and the solution becomes nearly homogeneous, a fractionating column and a vacuum pump are attached to the flask, and the solution is heated to 30° C. to 35° C. and is stirred under reduced pressure to distill off the organic solvent.

The distillation is terminated after 6 g of the organic solvent, which corresponds to the total amount of THF and MEK added, is distilled off. Infrared Absorber Dispersion (hereinafter referred to as "IR Dispersion") (1) is obtained, which contains 0.25% by mass of Compound (A1) as an infrared absorber.

Preparation of Ink

Preparation of Yellow Ink

A yellow ink of Example 1 is prepared by mixing IR Dispersion (1) and a pigment ink (yellow) having the composition shown in Table 1 (2800 inkjet color continuous feed printing system, available from Fuji Xerox Co., Ltd.) in a mass ratio of 1:4 and dispersing the mixture using an ultrasonic disperser.

TABLE 1

| Composition of pigment ink (yellow) | Content (% by mass) |
| --- | --- |
| Water | 40-60 |
| Polyalkylene glycol triol | 15-30 |
| Glycol | 10-20 |
| Organic compound | 5-10 |
| Yellow pigment | 3-7 |
| Acrylic polymer | 1-5 |
| Nonionic surfactant | 0.5-1.5 |

Preparation of Magenta Ink

A magenta ink of Example 1 is prepared in the same manner as the yellow ink except that a pigment ink (magenta) having the composition shown in Table 2 (2800 inkjet color continuous feed printing system, available from Fuji Xerox Co., Ltd.) is used.

TABLE 2

| Composition of pigment ink (magenta) | Content (% by mass) |
| --- | --- |
| Water | 40-60 |
| Polyalkylene glycol triol | 10-20 |
| Glycol | 10-20 |
| Organic compound | 5-10 |
| Magenta pigment | 3-7 |
| Acrylic polymer | 1-5 |
| Nonionic surfactant | 0.5-1.5 |

Preparation of Cyan Ink

A cyan ink of Example 1 is prepared in the same manner as the yellow ink except that a pigment ink (cyan) having the composition shown in Table 3 (2800 inkjet color continuous feed printing system, available from Fuji Xerox Co., Ltd.) is used.

TABLE 3

| Composition of pigment ink (cyan) | Content (% by mass) |
| --- | --- |
| Water | 40-60 |
| Polyalkylene glycol triol | 15-30 |
| Glycol | 10-20 |
| Organic compound | 5-10 |
| Copper phthalocyanine pigment | 1-5 |
| Acrylic polymer | 0.5-1.5 |
| Nonionic surfactant | 0.5-1.5 |

Examples 2 to 6 and Comparative Examples 1 and 2

IR dispersions of Examples 2 to 6 and Comparative Examples 1 and 2 are prepared as in Example 1 except that the infrared absorber (squarylium compound) is replaced with those shown in Table 4. Yellow, magenta, and cyan inks of Examples 2 to 6 and Comparative Example 1 and 2 are then prepared as in Example 1.

Evaluation for Decrease in Infrared Absorption Capacity

The yellow, magenta, and cyan inks of the Examples and the Comparative Examples are evaluated for the decrease in infrared absorption capacity as follows.

Infrared Absorption Capacity Before Storage

The infrared absorption capacity of the yellow, magenta, and cyan inks of the Examples and the Comparative Examples before storage at a wavelength of 818 nm is measured using an infrared spectrophotometer (U-4100 available from Hitachi, Ltd.).

Infrared Absorption Capacity after Storage

The yellow, magenta, and cyan inks of the Examples and the Comparative Examples are stored for an extended period of time (at 60° C. for one month). The infrared absorption capacity after the storage is measured in the same manner as the infrared absorption capacity measured before the storage.

Decrease in Infrared Absorption Capacity

The decrease in infrared absorption capacity is calculated from the infrared absorption capacities measured before and after the storage by the following equation:

Decrease in infrared absorption capacity (%)=((infrared absorption capacity before storage−infrared absorption capacity after storage)/infrared absorption capacity before storage)×100

The calculated decrease in infrared absorption capacity is rated on the following scale:

G1 (A): less than 15%
G2 (B): less than 50%
G3 (C): less than 70%
G4 (D): 90% or more where G1 to G3 are acceptable. The results are summarized in Table 4.

TABLE 4

| | | Example 1 | Example 2 | Example 3 | Example 4 |
| --- | --- | --- | --- | --- | --- |
| Infrared absorber | | A1 | A2 | A3 | A4 |
| $R^a$: general formula (I-R) $-(CH_2)_e-C(CH_3)(CH_3)-R^e$ | | $-C(CH_3)(CH_3)-CH_3$ (t-Bu) | $-C(CH_3)(CH_3)-CH_3$ (t-Bu) | $-CH_2-CH(CH_3)(CH_3)$ (i-Bu) | $-(CH_2)_2-CH(CH_3)(CH_3)$ (i-Pen) |
| For Comparative Examples 1 and 2, substituent at position corresponding to substituent $R^a$ | | | | | |
| $R^b$ | | n-Pr | n-Pen | i-Bu | i-Pen |
| $R^c$ | | n-Pr | n-Pen | i-Bu | i-Pen |
| $R^d$ | | t-Bu | t-Bu | i-Bu | i-Pen |
| Decrease in infrared absorption capacity | Yellow | G3(C) | G3(C) | G2(B) | G2(B) |
| | Magenta | G3(C) | G3(C) | G2(B) | G2(B) |
| | Cyan | G3(C) | G3(C) | G3(C) | G3(C) |

TABLE 4-continued

| | Example 5 | Example 6 | Comparative Example 1 | Comparative Example 2 |
|---|---|---|---|---|
| Infrared absorber | A5 | A6 | B1 | B2 |
| $R^a$: general formula (I-R)<br>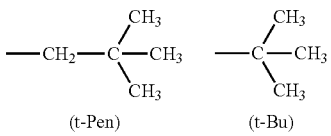<br>For Comparative Examples 1 and 2, substituent at position corresponding to substituent $R^a$ | —CH$_2$—C(CH$_3$)$_3$—CH$_3$ (with CH$_3$ groups) (t-Pen) | —C(CH$_3$)$_3$ (with CH$_3$ groups) (t-Bu) | n-Hex | n-Bu |
| $R^b$ | t-Pen | t-Bu | n-Hex | n-Bu |
| $R^c$ | t-Pen | t-Bu | n-Hex | n-Bu |
| $R^d$ | t-Pen | t-Bu | n-Hex | n-Bu |
| Decrease in infrared absorption capacity  Yellow | G2(B) | G1 (A) | G4(D) | G4(D) |
| Magenta | G2(B) | G1 (A) | G4(D) | G4(D) |
| Cyan | G2(B) | G1 (A) | G4(D) | G4(D) |

The abbreviations in Table 4 have the following meanings:
n-Pr: n-propyl
n-Bu: n-butyl
i-Bu: isobutyl
t-Bu: tertiary butyl
n-Pen: n-pentyl
i-Pen: isopentyl
t-Pen: tertiary pentyl
n-Hex: n-hexyl The results in Table 4 show that the Examples exhibit smaller decreases in infrared absorption capacity than the Comparative Examples.

The results also show that Examples 3 to 6 (Compounds A3 to A6), where all of the four alkyl end groups of the squarylium compound are branched alkyl groups, exhibit smaller decreases in infrared absorption capacity than Example 1 (Compound A1) and Example 2 (Compound A2), where two of the four alkyl end groups are branched alkyl groups.

The results also show that Example 5 (Compound A5) and Example 6 (Compound A6), where all of the four alkyl end groups of the squarylium compound are tertiary alkyl groups, exhibit smaller decreases in infrared absorption capacity than Example 3 (Compound A3), where all of the four alkyl end groups are isobutyl groups, and Example 4 (Compound A4), where all of the four alkyl end groups are isopentyl groups.

The results also show that Example 6 (Compound A6), where all of the four alkyl end groups of the squarylium compound are tertiary butyl groups, exhibits a smaller decrease in infrared absorption capacity than Example 5 (Compound A5), where all of the four alkyl end groups are tertiary pentyl groups.

The yellow, magenta, and cyan inks of Comparative Examples 1 and 2 are also analyzed for the structure of the infrared absorbers present in the inks after extended storage (at 60° C. for one month). The structure of the infrared absorbers is analyzed using a gas chromatograph equipped with a mass spectrometer (GCMS-QP2010 available from Shimadzu Corporation and PY-2020iD available from Frontier Laboratories Ltd.).

The results show that both Compounds (B1) and (B2) present in the yellow, magenta, and cyan inks of Comparative Examples 1 and 2 are decomposed into two decomposition products as a result of the breakage of the bond between the squaric-acid-derived four-membered ring located in the center and the thiopyrylium ion linked to one end of the four-membered ring via a double bond.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An aqueous ink comprising:
a colorant;
an aqueous solvent; and
as an infrared absorber, a compound represented by general formula (I):

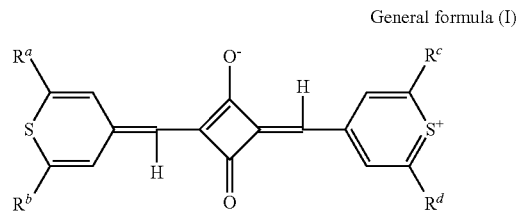

General formula (I)

wherein $R^b$, $R^c$, and $R^d$ are each independently alkyl, and $R^a$ is a group represented by general formula (I-R):

General formula (I-R)

wherein $R^e$ is hydrogen or methyl, and e is an integer of 0 to 3.

2. The aqueous ink according to claim 1, wherein at least one of $R^b$, $R^c$, and $R^d$ in general formula (I) is a group represented by general formula (I-R).

3. The aqueous ink according to claim 2, wherein each of $R^b$, $R^c$, and $R^d$ in general formula (I) is a group represented by general formula (I-R).

4. The aqueous ink according to claim 3, wherein $R^e$ in general formula (I-R) is methyl.

5. The aqueous ink according to claim 3, wherein e in general formula (I-R) is 0.

6. The aqueous ink according to claim 4, wherein e in general formula (I-R) is 0.

7. The aqueous ink according to claim 2, wherein $R^e$ in general formula (I-R) is methyl.

8. The aqueous ink according to claim 7, wherein e in general formula (I-R) is 0.

9. The aqueous ink according to claim 2, wherein e in general formula (I-R) is 0.

10. The aqueous ink according to claim 1, wherein $R^e$ in general formula (I-R) is methyl.

11. The aqueous ink according to claim 10, wherein e in general formula (I-R) is 0.

12. The aqueous ink according to claim 1, wherein e in general formula (I-R) is 0.

13. An ink cartridge containing the aqueous ink according to claim 1.

14. An ink drying system comprising an irradiation unit that irradiates the aqueous ink according to claim 1 on a recording medium with infrared radiation.

15. An ink drying method comprising irradiating the aqueous ink according to claim 1 on a recording medium with infrared radiation.

16. A recording apparatus comprising:
   an applying unit that applies the aqueous ink according to claim 1 to a recording medium; and
   an irradiation unit that irradiates the aqueous ink on the recording medium with infrared radiation.

17. A recording method comprising:
   applying the aqueous ink according to claim 1 to a recording medium; and
   irradiating the aqueous ink on the recording medium with infrared radiation.

* * * * *